(12) United States Patent
Sekimoto et al.

(10) Patent No.: US 8,107,006 B2
(45) Date of Patent: Jan. 31, 2012

(54) CAMERA MODULE AND ELECTRONIC DEVICE INCLUDING THE SAME

(75) Inventors: Yoshihiro Sekimoto, Osaka (JP); Atsushi Semi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 310 days.

(21) Appl. No.: 12/461,908

(22) Filed: Aug. 27, 2009

(65) Prior Publication Data
US 2010/0053412 A1    Mar. 4, 2010

(30) Foreign Application Priority Data

Aug. 28, 2008  (JP) ................................ 2008-220246
Aug. 3, 2009   (JP) ................................ 2009-180498

(51) Int. Cl.
H04N 9/64   (2006.01)
H04N 5/232  (2006.01)
H04N 5/225  (2006.01)
G03B 13/00  (2006.01)

(52) U.S. Cl. .......................... 348/374; 348/248; 348/357

(58) Field of Classification Search .................. 348/241, 348/248, 340, 345, 357, 373–376
See application file for complete search history.

(56) References Cited

U.S. PATENT DOCUMENTS

| 7,114,862 | B2* | 10/2006 | Huang ........................... 396/452 |
| 7,605,864 | B2* | 10/2009 | Takahashi et al. ............. 348/374 |
| 7,613,389 | B2* | 11/2009 | Suzuki et al. ................... 396/89 |
| 7,627,238 | B2* | 12/2009 | Osaka et al. .................... 396/85 |
| 7,699,542 | B2* | 4/2010 | Watanabe et al. ............. 396/448 |
| 7,869,149 | B2* | 1/2011 | Ke ................................. 359/824 |
| 7,871,210 | B2* | 1/2011 | Masuzawa et al. ........... 396/502 |
| 2005/0179803 | A1* | 8/2005 | Sawai ........................... 348/335 |
| 2007/0077061 | A1 | 4/2007 | Watanabe et al. |
| 2007/0086770 | A1 | 4/2007 | Okita et al. |
| 2009/0141161 | A1* | 6/2009 | Kawamoto .................... 348/340 |
| 2009/0295983 | A1* | 12/2009 | Sekimoto et al. ............. 348/362 |
| 2010/0157137 | A1 | 6/2010 | Imai et al. |

FOREIGN PATENT DOCUMENTS

| EP | 1630580 A1 | 3/2006 |
| JP | 2006-050693 | 2/2006 |
| JP | 2007-108596 A | 4/2007 |

(Continued)

OTHER PUBLICATIONS

U.S. Appl. No. 12/454,813, filed May 22, 2009.

(Continued)

*Primary Examiner* — Daniel M Pasiewicz
(74) *Attorney, Agent, or Firm* — Edwards Wildman Palmer LLP; David G. Conlin; David A. Tucker

(57) ABSTRACT

A camera module 1 of the present invention includes a moving magnet type mechanical shutter 2 and a lens unit 3 (lens drive section) for driving a lens by electromagnetic force. A magnetic field for driving the lens is set so that a light path is closed by a shutter fin while a magnetic field leaked from the lens unit 3 is acting on a drive mechanism of the mechanical shutter 2. With the configuration, the leak magnetic field leaked from the lens unit 3 causes the light path to be closed at a faster speed by the shutter fin of the mechanical shutter 2. Accordingly, generation of a smear can be prevented by the camera module including the lens drive section and the moving magnet type mechanical shutter, which are driven by the electromagnetic force.

16 Claims, 14 Drawing Sheets

FOREIGN PATENT DOCUMENTS

| | | |
|---|---|---|
| JP | 2007-174795 | 7/2007 |
| JP | 2007-316477 | 12/2007 |
| JP | 2008-111876 A | 5/2008 |
| JP | 2008-134300 A | 6/2008 |
| WO | WO-2004-107007 A1 | 12/2004 |
| WO | WO-2005/036251 | 4/2005 |

OTHER PUBLICATIONS

U.S. Office Action in regard to U.S. Appl. No. 12/454,813 dated Oct. 7, 2011.

* cited by examiner

PRIOR ART

CAMERA MODULE AND ELECTRONIC DEVICE INCLUDING THE SAME

This Nonprovisional application claims priority under 35 U.S.C. §119(a) on (i) Patent Application No. 2008-220246 filed in Japan on Aug. 28, 2008 and (ii) Patent Application No. 2009-180498 filed in Japan on Aug. 3, 2009, the entire contents of which are hereby incorporated by reference.

TECHNICAL FIELD

The present invention relates to: a camera module which is provided in an electronic device such as a mobile phone; and an electronic device including the camera module. More specifically, the present invention relates to: a camera module which (i) includes a moving magnet type mechanical shutter and an electromagnetic driven type (VCM type) lens drive section and (ii) addresses a smear phenomenon; and an electronic device including the camera module.

BACKGROUND ART

For example, a phenomenon called "smear" occurs in a camera module including a CCD (Charge Coupled Device) as an image pickup element. The smear is a phenomenon in which a photographed image has a white zonate part in a case where (i) a subject to be photographed bears intense light such as the sun light or electric light and (ii) the intense light enters the image pickup element. The smear occurs due to a successive overflow of electric charge in the CCD. More specifically, when a light receiving element (pixel) of the CCD receives the intense light, the electric charge overflows in a part of the light receiving element. While the electric charge is moving among light receiving elements, a chain of overflows of electric charge occurs, thereby causing the smear.

In order to prevent the smear, a camera module often includes a mechanical shutter. The mechanical shutter shuts out the intense light which causes the smear before the smear occurs, thereby preventing a smear.

For example, Patent Literatures 1 through 3 disclose mechanical shutters for respective camera modules. FIG. 9 is a cross-sectional view of the camera module disclosed in Patent Literature 1. FIG. 10 is a cross-sectional view of the mechanical shutter disclosed in Patent Literature 2. FIG. 11 is a plain view of the mechanical shutter disclosed in Patent Literature 3.

More specifically, as shown in FIG. 9, a camera module 110 of Patent Literature 1 is arranged so that components such as a transparent plate 112, an image pickup optical system 113, an image pickup element 114, a substrate 115, and shutter fins 116 and 117 are stacked in an optical axis direction. A shutter actuator 118 for electromagnetically driving the shutter fins 116 and 117 is further provided on one side of the image pickup optical system 113.

Moreover, as shown in FIG. 10, a mechanical shutter 120 for a camera module disclosed in Patent Literature 2 is arranged so that a recessed part 121 in its center and shutter fins 122 and 123, an aperture fin 124, and drive mechanisms 126 and 127 for driving an auxiliary fin 125 are provided, in a dispersed manner, on both sides of the recessed part 121. Note that Patent Literature 2 is silent about an arrangement of an image pickup optical system such as an image pickup lens.

On the other hand, a mechanical shutter for a camera module disclosed in Patent Literature 3 operates based on the following principle. As shown in FIG. 11, a mechanical shutter 130 includes: a shutter base plate 131; an axis 132; and a rotor 133. The axis 132 is provided on the shutter base plate 131, and the rotor 133 is attached to the axis 132 so as to rotate around the axis 132. The rotor 133 is a bipolar permanent magnet. That is, the mechanical shutter 130 is a moving magnet type shutter driven by the rotor (permanent magnet) 133. The mechanical shutter 130 includes a substantially U-shaped yoke 134 having two leg parts 134a and 134b whose leading ends are respective magnetic pole parts. Further, a bobbin 136, around which a coil 135 is wound, is fit into the leg part 134b.

According to the mechanical shutter 130, while a current is supplied to the coil 135, a magnetic field generated from the coil 135 acts on the magnetic poles parts (the leading ends of the leg parts 134a and 134b). Then, the magnetic field further acts on the rotor 133 so as to rotate the rotor 133. This causes a shutter fin (not illustrated) to be rotated in conjunction with the rotation of the rotor 133, thereby opening or closing an aperture 137 provided in the center of the mechanical shutter 130. Note that a direction of the magnetic field which acts on the rotor 133 is reversed in accordance with a direction of the current supplied to the coil 135. It follows that the rotor 133 can be rotated clockwise or anticlockwise depending on the magnetic field which acts on the rotor 133.

On the other hand, in these years, cases have been increased in which a camera module having an auto-focus function is employed in a mobile phone. The auto-focus function is achieved by providing a lens drive device in the camera module. The lens drive device encompasses various types such as a VCM (Voice Coil Motor) type, a stepping motor utilizing type, and a piezoelectric element utilizing type. These types of lens drive devices have already been available in the market.

For example, Patent Literature 4 discloses a VCM type lens drive device. FIG. 12 is a cross-sectional view of the lens drive device of Patent Literature 4. The lens drive device 200 includes a holder 202 which holds a lens 201 in the center thereof. Plate springs 203U and 203L are provided on the top part and on the bottom part of the holder 202, respectively. This causes the holder 202 to be supported so that the lens 201 can move in an optical axis direction.

Moreover, a coil 204 is fixed to a flange part of the holder 202. The coil 204 is contained in a yoke 205. A permanent magnet 206 is provided on an inside face of the yoke 205 so as to face the coil 204 while being away from the coil 204. This arrangement makes it possible to drive the lens drive device 200 by use of electromagnetic force.

On the other hand, three projections 208 are formed on a base 207. In the assembly work state of the lens drive device 200, the projections 208 support the holder 202.

A cover 209 is provided above the yoke 205. The cover 209 and the base 207 have apertures 210 and 211, respectively, in the centers thereof. The apertures 210 and 211 are provided for passing through light.

However, the camera module including the moving magnet type mechanical shutter and the VCM type lens drive device has a problem that the camera module cannot prevent generation of a smear completely.

More specifically, as described above, according to the mechanical shutter 130 illustrated in FIG. 11, the rotor 133 is rotated by the magnetic field which acts on the magnetic pole parts while the current is being supplied to the coil 135. Further, the shutter fin opens or closes the aperture (light path) 137 in conjunction with the rotation of the rotor 133.

However, in a case where the camera module includes the VCM type lens drive device 200 as well as the mechanical shutter 130, both the mechanical shutter 130 and the lens drive device 200 are to be driven by electromagnetic force. It follows that a magnetic field leaked from the lens drive device 200 also acts on the mechanical shutter 130. As a result, the magnetic field adversely affects the operation of the mechanical shutter 130.

More specifically, it is assumed that a magnetic field 138, which points from the leading end of the leg part 134b toward the leading end of the leg part 134a, acts on the magnetic pole parts. The mechanical shutter 130 shuts out intense light which causes a smear, thereby preventing generation of the smear. The magnetic field 138 is set so that the light causing the smear is shut out. This can be realized by supplying a predetermined current to the coil 135 so that the shutter fin operates at a predetermined speed.

However, while the magnetic field is being leaked from the lens drive device 200, the magnetic field acts on the magnetic field 138. This prevents normal operation of the mechanical shutter 130. It follows that the closing operation of the shutter fin for the aperture 137 is likely to be carried out at a speed slower than the predetermined speed. Thus, the problem occurs that the generation of the smear cannot be prevented completely.

CITATION LIST

Patent Literature 1
International Publication, No. WO2005/036251 (Publication Date: Apr. 21, 2005)
Patent Literature 2
Japanese Patent Application Publication, Tokukai, No. 2007-316477 A (Publication Date: Dec. 6, 2007)
Patent Literature 3
Japanese Patent Application Publication, Tokukai, No. 2007-174795 A (Publication Date: Jul. 5, 2007)
Patent Literature 4
Japanese Patent Application Publication, Tokukai, No. 2006-050693 A (Publication Date: Feb. 16, 2006)

SUMMARY OF INVENTION

The present invention is accomplished in view of the problem, and its object is to provide a camera module and an electronic device which can prevent generation of the smear even though the camera module and the electronic device include a lens drive section driven by electromagnetic force and a moving magnet type mechanical shutter.

In order to attain the object, a camera module of the present invention includes: a lens drive section for driving an image pickup lens in an optical axis direction by electromagnetic force, the image pickup lens being held in the lens drive section; a shutter section for closing or opening a light path so that an amount of light incident on the image pickup lens is controlled; and an image pickup element for converting an optical signal, which is received via the image pickup lens, into an electrical signal, the shutter section including a moving magnet type drive mechanism for driving the shutter fin by a permanent magnet which is driven by electromagnetic force, and a direction of a magnetic field for driving the image pickup lens being set so that the shutter fin closes the light path while a magnetic field leaked from the lens drive section is acting on the drive mechanism of the shutter section.

The camera module of the present invention includes the lens drive section and the shutter section which are driven by the electromagnetic force. This causes the magnetic field generated by the drive mechanism, in addition to the magnetic field leaked from the lens drive section, to act on the permanent magnet of the shutter section. This will adversely affect the opening and closing of the light path which are carried out by the shutter fin, thereby ultimately causing the smear.

According to the present invention, the magnetic field for driving the image pickup lens is set so as to cause the shutter fin to shut out the light path while the magnetic field leaked from the lens drive section acts on the drive mechanism of the shutter section. This causes the magnetic field generated by the drive mechanism, in addition to the leak magnetic field leaked from the lens drive section, to act on the shutter fin. With the arrangement, even while the leak magnetic field is being leaked from the lens drive section, the leak magnetic field acts in such a direction that the light path is closed. In other words, the leak magnetic field causes the light path to be closed at a faster speed by the shutter fin. Accordingly, it is possible to prevent generation of the smear even in the case of a camera module including the lens drive section and the shutter section, which are driven by the electromagnetic force.

Note that the direction of the magnetic field for driving the image pickup lens and the direction of the magnetic field leaked from the lens drive section may be either identical or different. The direction of the respective magnetic fields can be changed by changing (i) the direction of the coil for generating the magnetic field or (ii) the direction of the current being supplied to the coil.

For a fuller understanding of the nature and advantages of the invention, reference should be made to the ensuing detailed description taken in conjunction with the accompanying drawings.

DESCRIPTION OF EMBODIMENTS

An embodiment of the present invention is described below with reference to the attached drawings.

Figure 1:
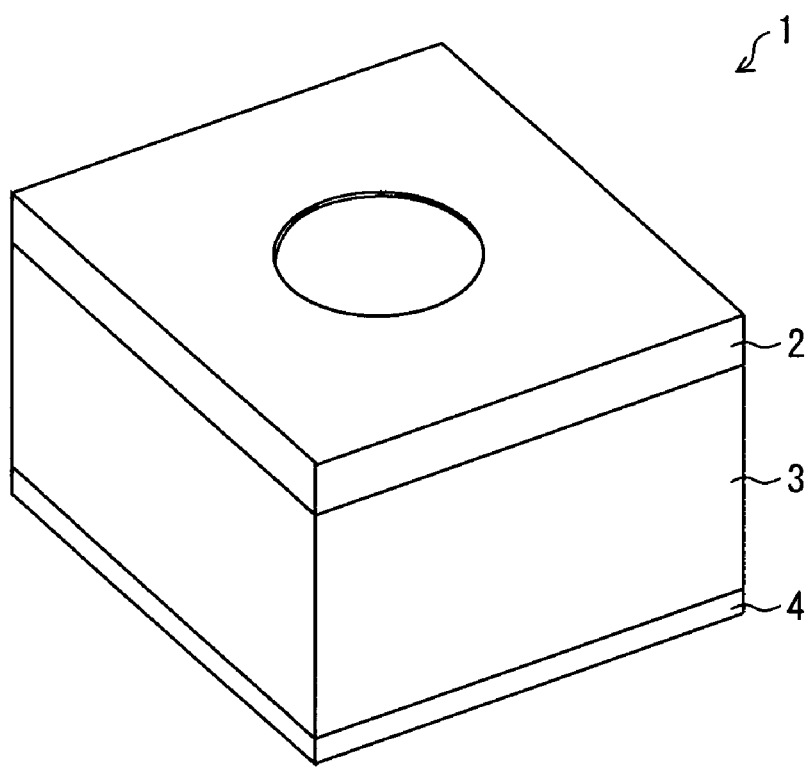
FIG. 1 is a perspective view illustrating a camera module of the present invention.
Figure 2:
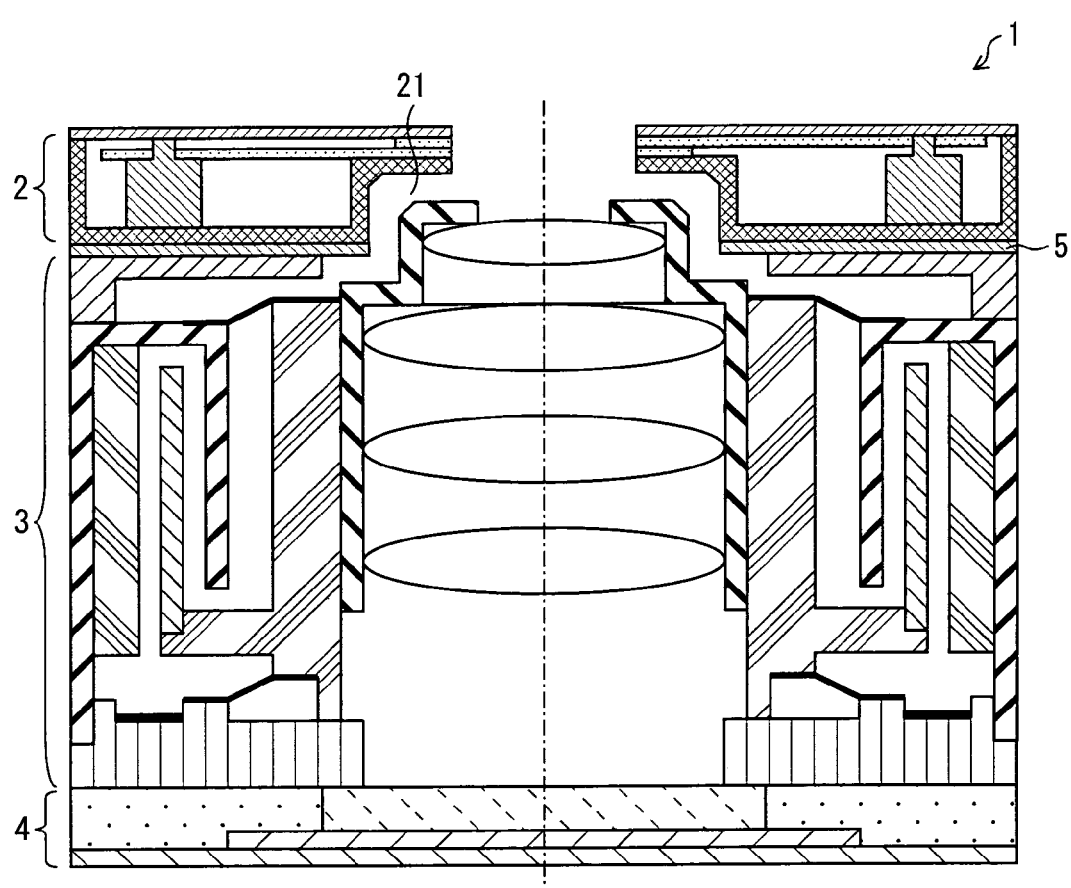
FIG. 2 is a cross-sectional view of the camera module shown in FIG. 1.

FIG. 1 is a perspective view illustrating a camera module including a lens drive device of the present invention. FIG. 2 is a cross-sectional view of the camera module including the lens drive device of the present invention.

As shown in FIG. 1, a camera module 1 of the present embodiment has a three-layer structure in which a mechanical shutter (shutter section) 2, a lens unit (lens drive section) 3, and an image pickup unit 4 are staked in this order in an optical axis direction. In the camera module 1 of the present embodiment, a magnetic shielding plate 5 is provided between the mechanical shutter 2 and the lens unit 3 (see FIG. 2). For convenience, in the following description, a side on which the mechanical shutter 2 is provided is referred to as "upward", whereas a side on which the image pickup unit 4 is provided is referred to as "downward".

<Mechanical Shutter 2>

Figure 3:
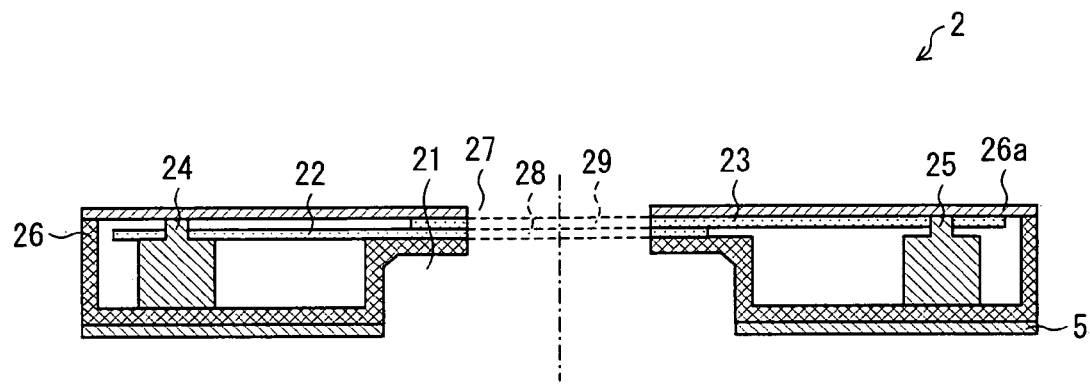
FIG. 3 is a cross-sectional view of a mechanical shutter included in the camera module shown in FIG. 1.
Figure 3:
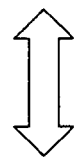
Figure 3:
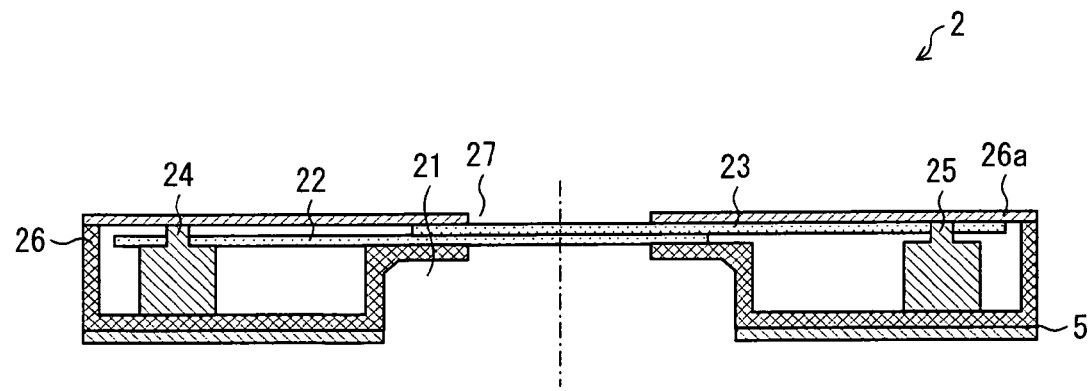

FIG. 3 is a cross-sectional view of the mechanical shutter 2. The upper part of FIG. 2 shows a state where the light path is opened, whereas the lower part of FIG. 2 shows a state where the light path is closed. The mechanical shutter 2 is of a moving magnet type, and is provided for controlling opening and closing of the light which enters the image pickup lens of the lens unit 3. That is, the mechanical shutter 2 is provided for preventing generation of the smear by shutting out the light which causes the smear.

More specifically, the mechanical shutter 2 has a recessed part 21 in the center of its rear face (the face closer to the lens unit 3). Further, a plurality (two in FIG. 3) of shutter fins 22 and 23, and drive mechanisms 24 and 25 for driving the shutter fins 22 and 23, respectively, are provided on both sides of the recessed part 21.

The shutter fins 22 and 23 and the drive mechanisms 24 and 25 are contained and fixed in a hollow case 26. The case 26 itself has the recessed part 21 in the center of its rear face. Moreover, a cover 26a is provided on the top face of the case 26 for at least preventing intrusion of foreign materials.

In the center of the case 26, an aperture 27 is formed for securing a light path (a dot-dash line in the drawing) so that light passes through. The shutter fins 22 and 23 have also apertures 28 and 29, respectively, for securing the light path. While the drive mechanisms 24 and 25 are being driven, the shutter fins 22 and 23 rotate (swing) in a face which is perpendicular to the light path, around the drive mechanism 24 and 25, respectively. The light path is opened, while the aperture 27 formed in the case 26 and the apertures 28 and 29 formed in the shutter fins 22 and 23 are overlapping each other (see the upper part of FIG. 3). This causes light to externally enter the lens unit 3, via the mechanical shutter 2.

On the other hand, the light is shut out, while the aperture 27 formed in the case 26 and the apertures 28 and 29 formed in the shutter fins 22 and 23 are not overlapping each other (see the lower part of FIG. 3). This causes no light to externally enter the lens unit 3. It is possible by thus driving the shutter fins 22 and 23 that the mechanical shutter 2 controls opening and closing of the light which externally enters the lens unit 3.

Note that the shutter fins 22 and 23 are not limited to the arrangement in which the apertures 28 and 29 are formed. Alternatively, the shutter fins 22 and 23 themselves can be arranged so that opening and closing of the light which externally enters the lens unit 3 are controlled, depending on whether the shutter fins 22 and 23 themselves are in a location causing the light path to be shut out or a location causing the light path to be opened.

Alternatively, it is possible to switch a filtering function between an available state and an unavailable state, by substituting one of the shutter fins 22 and 23 with an ND (Neutral Density) filter. Moreover, the total number of the ND filter and the shutter fins 22 and 23 is not limited to two, and can therefore be three or more or one.

A detailed description as to how the drive mechanisms 24 and 25 are arranged will be described later. Note that, in the camera module 1 of the present embodiment, the magnetic shielding plate 5 is provided on the entire rear face of the mechanical shutter 2 (the case 26).

<Lens Unit 3>

Figure 4:
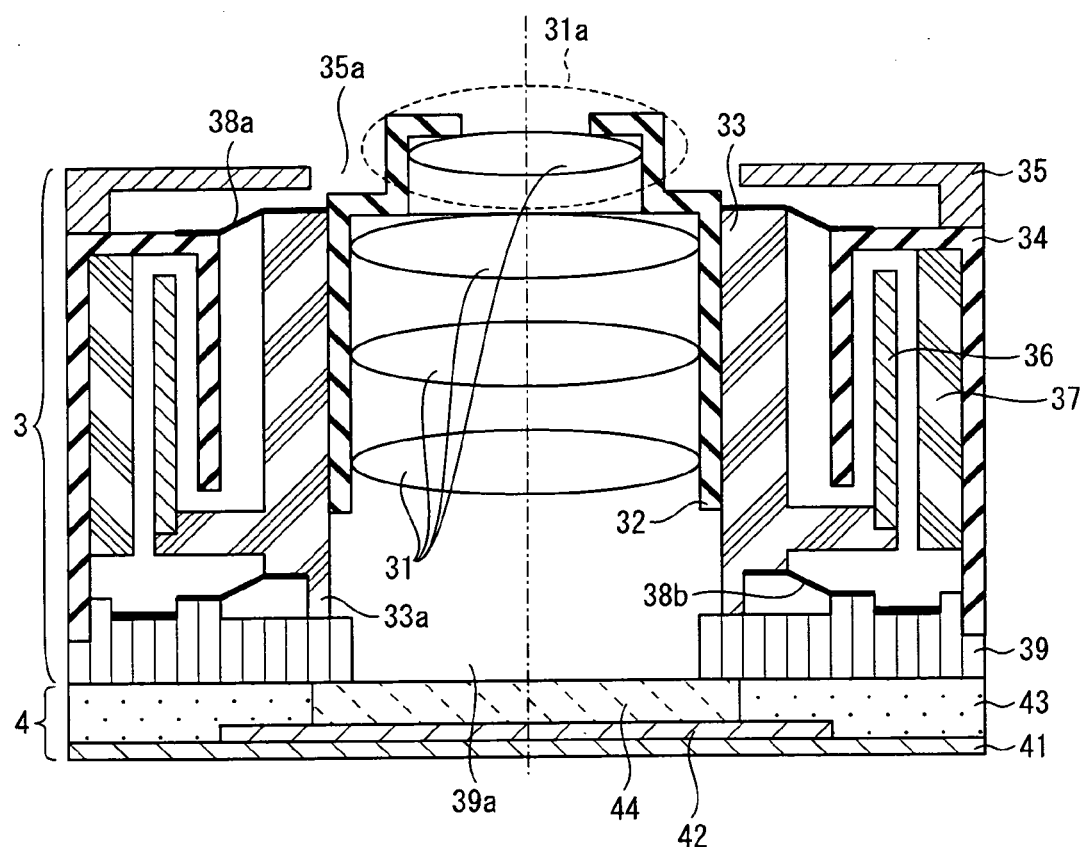
FIG. 4 is a cross-sectional view of a lens unit and an image pickup unit included in the camera module shown in FIG. 1.

The following describes the lens unit 3. FIG. 4 is a cross-sectional view of the lens unit 3 and the image pickup unit 4. The lens unit 3 is an image pickup optical system for forming an image of the subject to be photographed. That is, the lens unit 3 guides externally entered light toward a light-receiving section (image-pickup face) of the image pickup unit 4. The lens unit 3 includes: a movable section which moves in an optical axis direction; a container section for containing the movable section; and a drive section for driving the movable section in the optical axis direction.

More specifically, in the lens unit 3 shown in FIG. 4, a lens barrel 32 holding a plurality of lenses (image pickup lenses) 31 therein is fixed in a lens holder 33. These components are contained in a space formed by a base 39, yoke 34, and a cover 35. Note that, in the present embodiment, the lens barrel 32 holding a plurality of lenses 31 is fixed in the lens holder 33. Alternatively, it is possible that a male screw is provided on one of the lens barrel 32 and the lens holder 33 and a female screw is provided on the other so as to adjust the height of the lens barrel 32 with respect to the lens holder 33.

The lens barrel 32 is a frame for holding the lens 31 therein. The lens holder 33 holds therein the lens barrel 32 which holds the lens 31. The lens 31 is arranged in the center of the lens barrel 32 and the lens holder 33. The lens barrel 32 and the lens holder 33 are respective hollow (cylindrical) members.

As described later, a leading end part of the lens 31 (leading end parts of the lens 31 and the lens barrel 32) forms a projecting part 31a which projects from a top face of the lens unit 3 (a top end face of the cover 35). The projecting part 31a is contained in the foregoing recessed part 21 of the mechanical shutter 2.

Note that, as described later, the lens 31, the lens barrel 32, and the lens holder 33 are movably provided in the optical axis direction, and constitute the movable section. Further, the movable section is contained in the container section. More specifically, the container section includes the base 39, the yoke 34, and the cover 35. The base 39 serves as a bottom section of the lens unit 3. That is, the base 39 is arranged on a light-emitting side of the lens unit 3.

The yoke 34 is a cylindrical member, and serves as a lateral section of the lens unit 3. The yoke 34 contains the movable section therein. The yoke 34 is fixed to the base 39. In the present embodiment, the cover 35 is provided on the yoke 34. The cover 35 serves as an upper section (the top face) of the lens unit 3. Note that the cover 35 can be omitted in a case where the yoke 34 itself serves as the cover. In this case, an aperture 35a is equal to the inner diameter of the yoke 34.

The base 39 has an aperture 39a in its center. Moreover, the cover 35 has the aperture 35a in its center. The apertures 39a and 35a are provided for causing the incident light to pass through, and are arranged in the optical axis direction. According to the container section, (i) the aperture 35a is provided on the light-entering side and (ii) the aperture 39a is provided on the light-emitting side, so that the light path is secured in the optical axis direction. Because of the arrangement, each part of the lens 31, the lens barrel 32, and the lens holder 33 is exposed in the aperture 35a.

The drive section of the lens unit 3 includes a coil 36 and a permanent magnet 37 so that the lens 31 is driven by the electromagnetic force in the optical axis direction. More specifically, in the present embodiment, a magnetic field, which is generated by supplying a current to the coil 36, acts on the permanent magnet 37. This allows the lens 31 (lens holder 33) to be driven in the optical axis direction. The coil 36 is fixed to a flange section of the lens folder 33. The coil 36 is provided so as to extend toward the light-entering side (the aperture 35a side). Moreover, a magnetic circuit including the permanent magnet 37 is provided on inner face of the yoke 34 so as to face the coil 36. The permanent magnet 37 is set so as to have the magnetic poles whose magnetic field is directed in a direction in which the shutter fins 22 and 23 of the mechanical shutter 2 shut out the light path.

Further, according to the lens unit 3 of the present embodiment, plate springs 38a and 38b are provided on upper and lower faces (top face and bottom face) of the lens holder 33, respectively. The plate springs 38a and 38b are respective pressing sections for pressing the movable section toward the light-emitting side. Each of the plate springs 38a and 38b has a spiral-patterned shape. Each of the plate springs 38a and 38b is not limited to a specific one, provided that one end is fixed to the movable section and the other end is fixed to the container section. In each of the plate springs 38a and 38b of the present embodiment, one end is fixed to the yoke 34 or the base 39, and the other end is fixed to the lens holder 33. Each of the plate springs 38a and 38b movably and secondarily supports, by use of the elastic force, the lens holder 33 in the optical axis direction.

<Image Pickup Unit 4>

The following describes how the image pickup unit 4 is arranged. The image pickup unit 4 is provided on the bottom side of the lens unit 3 as shown in FIG. 4. The image pickup up unit 4 is an image pickup section for converting into an electrical signal an image of the subject to be photographed which is formed by the lens unit 3. That is, the image pickup unit 4 is a sensor device for carrying out a photoelectric conversion with respect to the light received from the lens unit 3.

The image pickup unit 4 includes a solid state image pickup element 42 on a substrate 41 (see FIG. 4). Moreover, the solid state image pickup element 42 is contained in a holder 43 provided on the substrate 41. Note that a transparent member 44, which covers the solid state image pickup element 42, is provided above the holder 43. In the present embodiment, a lower face of the holder 43 is designed to be in touch with both the substrate 41 and the solid state image pickup element 42. However, the holder 43 may be either in touch with only the substrate 41 or in touch with only the solid state image pickup element 42 in accordance with a size tolerance of the holder 43.

The substrate 41 is a substrate having a patterned wiring (not illustrated). The patterned wiring causes the substrate 41 and the solid state image pickup element 42 to be electrically connected. A printed circuit board, a ceramic substrate, or the like is used as the substrate 41.

The solid state image pickup element 42 converts the image of the subject to be photographed which is formed by the lens unit 3 into an electrical signal. That is, the solid state image pickup element 42 is a sensor device for converting into an electrical signal a optical signal received from the lens 31 of the lens unit 3. A device such as a CCD or a CMOS sensor IC is used as the solid state image pickup element 42. The front face (upper face) of the solid state image pickup element 42 has the light-receiving section (not illustrated) on which a plurality of pixels are arranged in a matrix manner. The light-receiving section is a region where the light received from the lens unit 3 is converged so that an image is formed. From this, the light-receiving section can be referred to as a pixel area.

The solid state image pickup element 42 converts into an electrical signal the image of the subject to be photographed which is converged and formed on the light-receiving section (pixel area), and then outputs the electrical signal as an analog image signal. That is, a photoelectric conversion is carried out on the light-receiving section. The solid state image pickup element 42 is controlled by a DSP (not illustrated). The image signal generated by the solid state image pickup element 42 is processed by the DSP.

The transparent member 44 covers the light-receiving section of the solid state image pickup element 42. The transparent member 44 is made of material such as glass. Note that, in the present embodiment, an infrared ray blocking film (IR cut film) is formed on a surface of the transparent member 44. As such, the transparent member 44 has a function of shutting out an infrared ray.

<Magnetic Shielding Plate 5>

The following describes how the magnetic shielding plate 5 is arranged. The camera module 1 of the present embodiment includes the magnetic shielding plate 5, which adjusts the size of a magnetic field leaked from the lens unit 3. Note that the magnetic shielding plate 5 is not an essential component for the camera module 1. The magnetic shielding plate 5 is preferably provided in a case where the magnetic field leaked from the lens unit 3 is large.

The magnetic shielding plate 5 can be arbitrarily adjusted in thickness and/or area in accordance with the size of the magnetic field leaked from the lens unit 3 and a resistance property to the magnetic field on the mechanical shutter 2 side. The magnetic shielding plate 5 is described later in detail.

As described above, the camera module 1 of the present embodiment includes the mechanical shutter 2 and the lens unit 3 which are driven by the electromagnetic force. This causes the magnetic field generated by the drive mechanisms 24 and 25, in addition to the magnetic field leaked from the lens unit 3, to act on the mechanical shutter 2 (shutter fins 22 and 23, respectively). This will adversely affect the opening and closing of the light path which are carried out by each of the shutter fins 22 and 23, thereby ultimately causing the smear. In particular, according to the camera module 1, the mechanical shutter 2 and the lens unit 3 are stacked in the optical axis direction so as to be close to one another. As such, the magnetic field generated by the mechanical shutter 2 is easily affected by the magnetic field generated by the lens unit 3, or vice versa. This causes the smear to be most likely to be generated.

Figure 5:
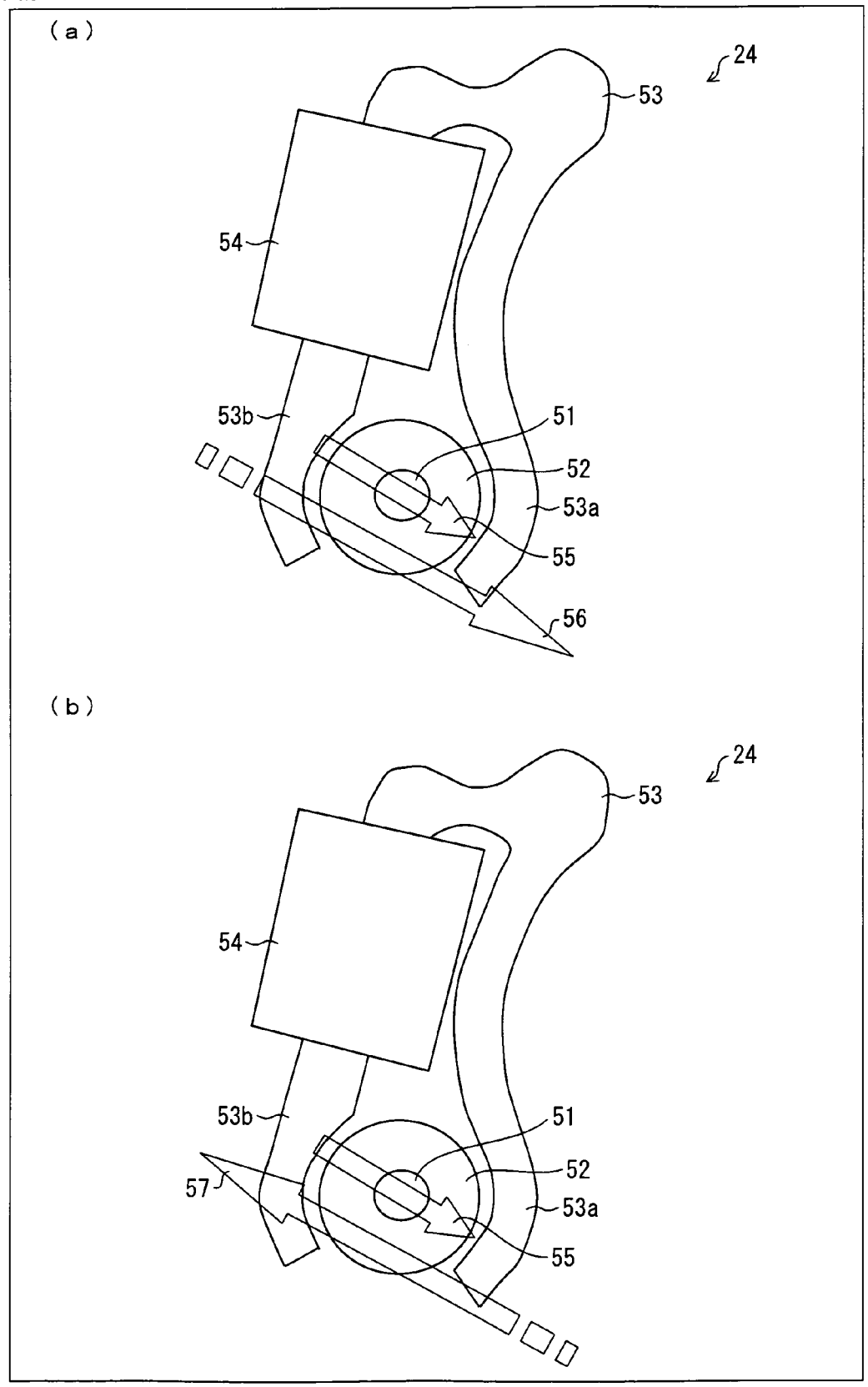
FIG. 5 is a plain view of a drive mechanism of the mechanical shutter included in the camera module shown in FIG. 1. Part (a) of FIG. 5 is a view in a case where a magnetic field acting on a rotor of the drive mechanism and a leak magnetic field leaked from the lens unit are identical in direction. Part (b) of FIG. 5 is a view in a case where the magnetic field acting on the rotor of the drive mechanism and the leak magnetic field leaked from the lens unit are opposite in direction.

More specifically, FIG. 5 is a plain view of the drive mechanism 24. Part (a) of FIG. 5 shows a case where (i) a magnetic field acting on the rotor 52 of the drive mechanism 24 and (ii) a magnetic field leaked from the lens unit 3 are identical in direction. Part (b) of FIG. 5 shows a case where (i) the magnetic field acting on the rotor 52 of the drive mechanism 24 and (ii) the magnetic field leaked from the lens unit 3 are opposite in direction. Note that the drive mechanism 25 has a similar arrangement to the drive mechanism 24. Note also that the magnetic field acting on the rotor 52 of the drive mechanism 24 and the leak magnetic field leaked from the lens unit 3 are not limited to a case where their magnetic fields are completely in parallel with one another. Alternatively, the present embodiment includes a case where the magnetic field acting on the rotor 52 is at an angle with the magnetic field leaked from the lens unit 3.

Figure 11:
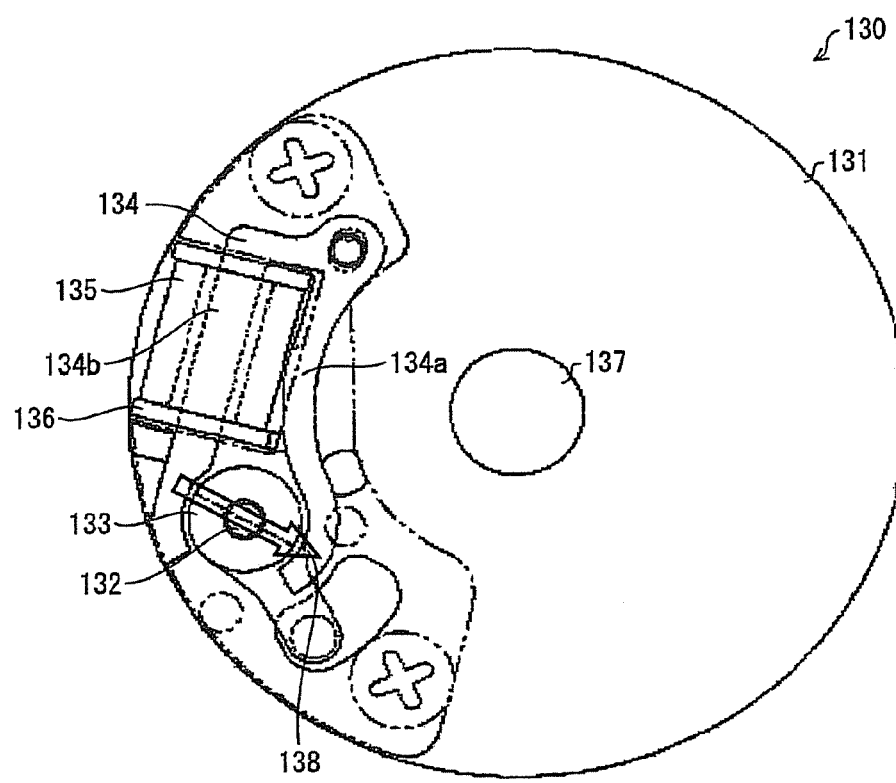
FIG. 11 is a plain view illustrating a mechanical shutter of Patent Literature 3.
Figure 12:
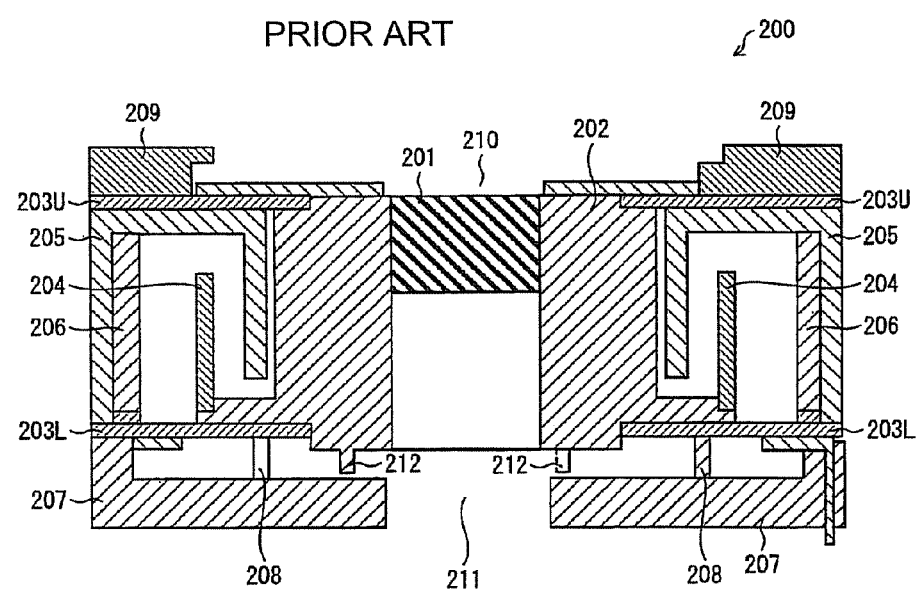
FIG. 12 is a cross-sectional view illustrating a lens drive device of Patent Literature 4.

The drive mechanisms 24 and 25 are not limited in particular, provided that the drive mechanisms 24 and 25 are of a moving magnet type so as to drive the shutter fins 22 and 23, respectively. A known drive mechanism, which is disclosed for example in the foregoing Cited Document 3 (see FIG. 11) can be used as each of the drive mechanisms 24 and 25.

As shown in FIG. 5, the drive mechanism 24 of the mechanical shutter 2 includes: an axis 51; a rotor 52 which is rotatably provided around the axis 51; a substantially U-shaped yoke 53; and a coil 54. The rotor 52 is a bipolar permanent magnet. That is, the mechanical shutter 2 is shutter of a moving magnet type driven by the rotor (permanent magnet) 52. The drive mechanism 24 causes the shutter fin 22 to be driven by the rotor (permanent magnet) 52 which is driven by the electromagnetic force generated by the drive mechanism 24. The yoke 53 has two leg parts 53a and 53b whose leading ends are respective magnetic pole parts. The leg parts 53a and 53b are provided so that the rotor 52 is sandwiched between the leg parts 53a and 53b. The coil 54 is wound around the leg part 53b.

In the drive mechanism 24, it is assumed that while a current having a predetermined direction is being supplied to the coil 54, a magnetic field 55 which is directed from the leg part 53b to the leg part 53a (see part (a) of FIG. 5) is generated so that the rotor 52 rotates the shutter fin 22 (see FIG. 3) in the direction in which the light path is closed. In this case, a leak magnetic field 56 leaked from the lens unit 3 is directed in the same direction as the magnetic field 55. This causes the leak magnetic field 56 to be added, as a bias magnetic field, to the magnetic field 55 which is generated by the magnetic pole parts of the mechanical shutter 2 (drive mechanism 24). That is, the rotor 52 receives a magnetic field which is larger than the actual magnetic field 55 generated by the drive mechanism 24. This allows the shutter fin 22 to close the light path at a faster speed, as compared to a case where no leak magnetic field 56 is generated by the lens unit 3.

On the other hand, in a case where the light path is opened by the shutter fin 22 (in a case where the shutter is opened), the rotor 52 receives a magnetic field which is directed in the direction opposite to the magnetic field 55 shown in part (a) of FIG. 5, while a current having a reverse direction is being supplied to the coil 54. In this case, a leak magnetic field 56 leaked from the lens unit 3 is in a direction reverse to the magnetic field which is in a direction reverse to the magnetic field 55 of part (a) of FIG. 5. This causes the leak magnetic field 56 leaked from the lens unit 3 to act as a reverse bias magnetic field with respect to the magnetic field which is in the direction reverse to the magnetic field 55 shown in part (a) of FIG. 5 and which is generated by the magnetic pole parts of the mechanical shutter 2 (drive mechanism 24). That is, the rotor 52 receives a magnetic field which is smaller than the magnetic field reverse to the actual magnetic field 55 generated by the drive mechanism 24 shown in part (a) of FIG. 5. This causes the shutter fin 22 to open the light path at a slower speed, as compared to a case where no leak magnetic field 56 is generated by the lens unit 3. The mechanical shutter 2 carries out a function of preventing generation of the smear by shutting out intense light which causes the smear. In view of the function, the time required for opening the light path is less important than the time required for shutting out the light path. That is, no significant problem occurs even if the light path is slowly opened, provided that the light path is opened without any problem (i.e., provided that the light path can be opened).

On the other hand, as shown in part (b) of FIG. 5, in a case where a leak magnetic field 57 is in a direction reverse to the leak magnetic field 56 shown in part (a) of FIG. 5, the shutter fin 22 closes the light path at a slower speed, as compared to a case where no leak magnetic field 57 is generated. This causes, the leak magnetic field 57 leaked from the lens unit 3 to act as a reverse bias magnetic field with respect to the magnetic field 55 which is generated by the magnetic pole parts of the mechanical shutter 2 (drive mechanism 24). That is, the rotor 52 receives a magnetic field which is smaller than the actual magnetic field 55 generated by the drive mechanism 24. This causes the shutter fin 22 to shut out the light path at a slower speed, as compared to a case where no leak magnetic field 57 is generated by the lens unit 3. However, in a case where the light path is closed at a slower speed, the function of preventing generation of the smear is impaired in the mechanical shutter 2. The time required for closing the light path (the time required for shutting out the light path) is an important specification to the mechanical shutter 2. As such, it is not preferable to generate the leak magnetic field 57 which adversely affects the time required for closing the light path (the time required for shutting out the light path), as shown in part (b) of FIG. 5. Note that, in the case shown in part (b) of FIG. 5, the light path is opened at a fast speed which is in contrast to the case shown in part (a) of FIG. 5.

Figure 6:
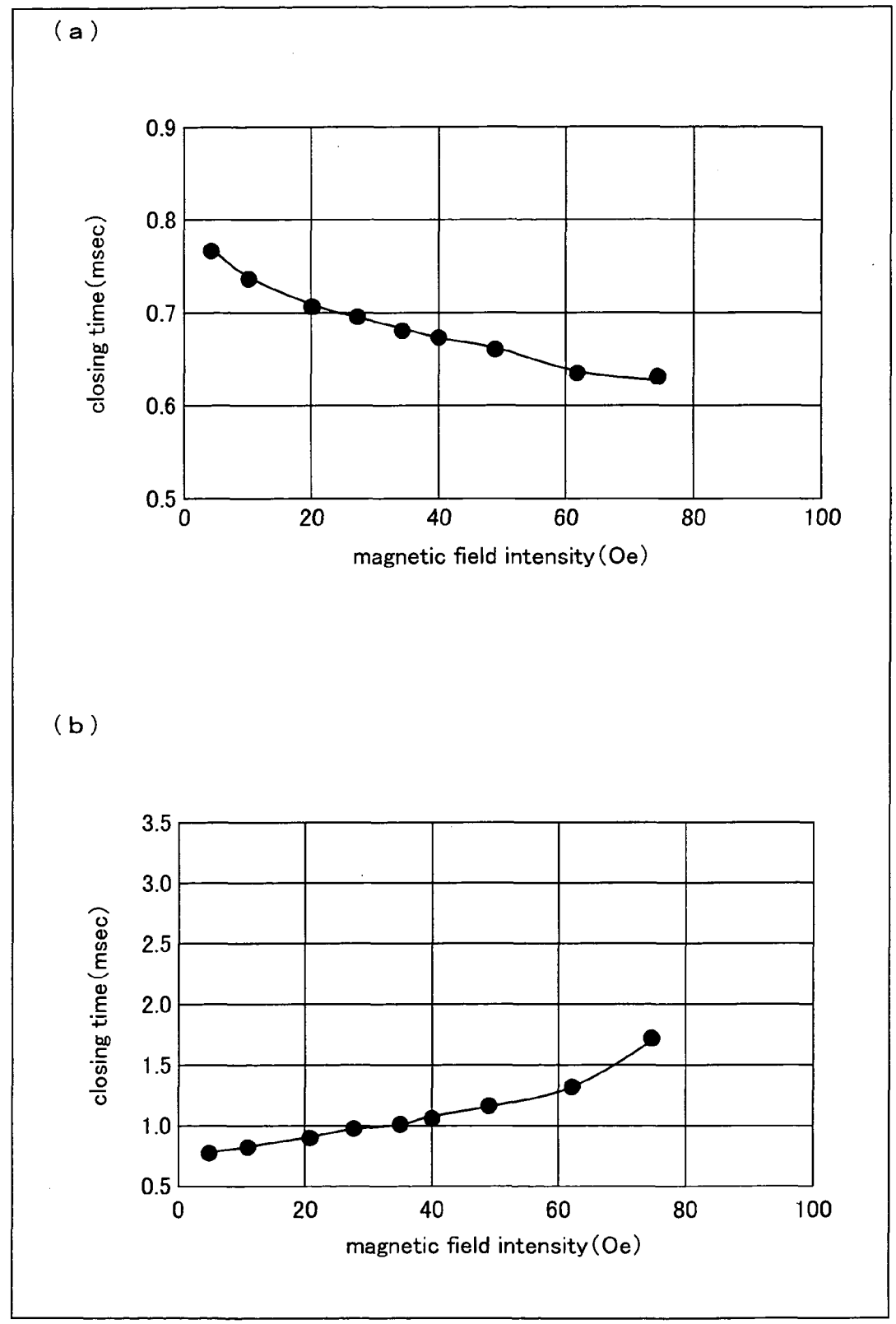
FIG. 6 is a graph of time required for closing a light path by the mechanical shutter included in the camera module shown in FIG. 1. Part (a) of FIG. 6 is a graph in a case where the magnetic field acting on the rotor of the drive mechanism and the leak magnetic field leaked from the lens unit are identical in direction. Part (b) of FIG. 6 is a graph in a case where the magnetic field acting on the rotor of the drive mechanism and the leak magnetic field leaked from the lens unit are opposite in direction.

In order to address this, according to the camera module 1, the direction of a magnetic field for driving the lens 31 is set so as to cause the shutter fin 22 to shut out the light path while the leak magnetic field leaked from the lens unit 3 is acting on the drive mechanism 24 of the mechanical shutter 2. That is, the drive mechanism 24 has an arrangement as shown in part (a) of FIG. 5. FIG. 6 is a graph showing checked results of the opening and closing made by the shutter fin 22, which results are obtained in cases where the drive mechanism 24 has the part (a) of FIG. 6 shows a checked result of the drive mechanism 24 shown in part (a) of FIG. 5. Part (b) of FIG. 6 shows a checked result of the drive mechanism 24 shown in part (b) of FIG. 5. That is, the graphs depicted in parts (a) and (b) of FIG. 6 show the checked results obtained in respective cases where the directions of the leak magnetic fields 56 and 57, which are reverse to one another, act on the rotor 52 of the mechanical shutter 2. In each of the graphs depicted in parts (a) and (b) of FIG. 6, the vertical axis indicates the time required for closing the light path, and the horizontal axis indicates the intensity of the respective leak magnetic fields 56 and 57.

As shown in part (a) of FIG. 6, in the case of the drive mechanism 24 shown in part (a) of FIG. 5, the time required for closing the light path becomes shorter as the leak magnetic field 56 becomes larger, i.e., the light path is shut out at a faster speed. Note that the light path is also well opened in the range plotted in part (a) of FIG. 6.

On the other hand, as shown in part (b) of FIG. 6, in the case of the drive mechanism 24 shown in part (b) of FIG. 5, the time required for closing the light path becomes longer as the leak magnetic field 57 becomes larger, i.e., the light path is shut out at a slower speed.

As described above, with the drive mechanism 24 shown in part (a) of FIG. 5, the leak magnetic field 56 leaked from the lens unit 3 does not adversely affect the time, required for closing the light path, which is one of the most important specifications to the mechanical shutter 2. Rather, the time required for closing the mechanical shutter 2 can be shorted, as compared to a case where no leak magnetic field 56 is generated. This leads to realization of a highly functional mechanical shutter 2, thereby ultimately leading to realization of a highly functional camera module 1.

As described above, according to the camera module 1, the magnetic field for driving the lens 31 is set so as to cause the shutter fins 22 and 23 to shut out the light path while the magnetic field leaked from the lens unit 3 acts on the drive mechanisms 24 and 25 of the mechanical shutter 2. This causes the magnetic field generated by the drive mechanisms 24 and 25, in addition to the leak magnetic field leaked from the lens unit 3, to act on the shutter fins 22 and 23, respectively. With the arrangement, even while the leak magnetic field 56 is being leaked from the lens unit 3, the leak magnetic field 56 acts in such a direction that the light path is closed. In other words, the leak magnetic field 56 causes the light path to be closed at a faster speed by the shutter fins 22 and 23. Accordingly, it is possible to prevent generation of the smear even in the case of a camera module 1 including the lens unit 3 and the mechanical shutter 2, which are driven by the electromagnetic force.

Moreover, the camera module 1 includes the lens unit 3, and therefore can carry out a function of focusing by moving the lens 31 in the optical axis direction.

Further, according to the camera module 1 of the present embodiment, the mechanical shutter 2 and the lens unit 3 are stacked in the optical axis direction (see FIG. 2). That is, the lens unit 3 and the mechanical shutter 2 are arranged so as to be close to one another. This makes it easier for the leak magnetic field leaked from the lens unit 3 to act on the mechanical shutter 2. As such, it is possible to certainly prevent the generation of the smear.

Moreover, in the camera module 1, the permanent magnet 37 of the lens unit 3 causes a magnetic field to be generated in a direction (horizontal direction in the drawing) perpendicular to the optical axis. Accordingly, in such a stacked arrangement, the leak magnetic field leaked from the lens unit 3 acts, in the direction perpendicular to the optical axis, on the drive mechanisms 24 and 25 of the mechanical shutter 2. Further, the magnetic field for operating the mechanical shutter 2 is also in the direction perpendicular to the optical axis. This allows an arrangement in which one of the magnet fields is easily affected by the other. The camera module 1 can certainly prevent generation of smear even in such an arrangement where the mechanical shutter 2 and the lens unit 3 are stacked so that one of the magnet fields generated by them is easily affected by the other.

As is clearly described above, according to the camera module 1, the leak magnetic field leaked from the lens unit 3 acts so that the light path is closed by the shutter fins 22 and 23. Accordingly, in a case where the leak magnetic field is too large, the light path is closed at a faster speed by the shutter fins 22 and 23, whereas it will become sometimes difficult for the light path to be opened by the shutter fins 22 and 23.

In other words, the light path is opened at a slower speed by the shutter fins 22 and 23, in a case where the direction of the leak magnetic field leaked from the lens unit 3 is set so as to cause the light path to be closed at a faster speed by the shutter fins 22 and 23. The speed at which the light path is opened is not so important to the mechanical shutter 2. However, it is not preferable that the light path is not opened even though a predetermined current is being supplied. That is, it is an indisputable fact that the leak magnetic field leaked from the lens unit 3 causes the light path to be closed at a faster speed. But, there is a limit to the intensity of the leak magnetic field.

In view of this fact, in a case where the leak magnetic field is too large, it is preferable to provide the magnetic shielding plate 5 so as to reduce the intensity of the leak magnetic field to a desired intensity. The magnetic shielding plate 5 causes the leak magnetic field leaked from the lens unit 3 to the mechanical shutter 2 to be partially shielded. Accordingly, even while an excessive magnetic field is being leaked from the lens unit 3, such an excessive leak magnetic field is partially shielded by the magnetic shielding plate 5. That is, the magnetic shielding plate 5 can reduce the leak magnetic field. From this, even while an excessive magnetic field is being leaked, the shutter fins 22 and 23 can open the light path.

Thus, the magnetic shielding plate 5 is provided for reducing the action of the leak magnetic field. Moreover, it is preferable that the magnetic shielding plate 5 is provided between the mechanical shutter 2 and the lens unit 3. This certainly allows a reduction in the action of the leak magnetic field.

Moreover, according to the camera module 1 of the present embodiment, the leading end of the lens 31 (leading end parts of the lens 31 and the lens barrel 32) constitutes the projection 31a projecting from the top face of the lens unit 3 (the top face of the cover 35). Further, the projection 31a is projected from the top face of the lens unit 3 (the top face of the cover 35). In other words, the top face of the lens unit 3 (the top face of the cover 35) is arranged at a lower position than that of the projection 31a of the lens 31. Further, the projection 31a of the lens 31 is contained in the recessed part 21 in the rear face of the mechanical shutter 2. As such, a thickness (an apparent thickness) obtained after the mechanical shutter 2 is stacked on the top face of the lens unit 3 becomes thinner than the total thicknesses of the mechanical shutter 2 and the lens unit 3 obtained before the mechanical shutter 2 is stacked on the top face of the lens unit 3. This is because the top face of the lens unit 3 is lower than the projection 31a of the lens 31. Accordingly, even in a case where the mechanical shutter 2 is stacked on the lens unit 3, the camera module 1 does not become too thick.

That is, according to the arrangement of the camera module 1, parts (leading ends) of the lens 31 and the lens barrel 32 are (i) projected from the top face of the lens unit 3 and (ii) contained in the recessed part 21 of the mechanical shutter 2. With the arrangement, (i) it is possible to effectively use a dead space in the mechanical shutter 2 and (ii) it is possible to make thinner the thickness of the camera module 1 as compared to a case where the mechanical shutter 2 is simply stacked on the lens unit 3. Moreover, since the mechanical shutter 2 and the lens unit 3 are arranged to be stacked, it is possible to provide a more compact camera module, as compared to the conventional camera module in which the mechanical shutter 2 and the lens unit 3 are juxtaposed.

Thus, the camera module 1, which includes the mechanical shutter 2 and the lens unit 3, can realize miniaturization and reduction in thickness at the same time.

FIG. 2 shows a state where the drive section of the lens unit 3 is not driving (steady state: home position) in the camera module 1. On the other hand, FIG. 7 is a cross sectional view showing a state where the drive section of the lens unit 3 is driven and the lens 31 (lens holder 33) is moved to its highest position.

Figure 7:
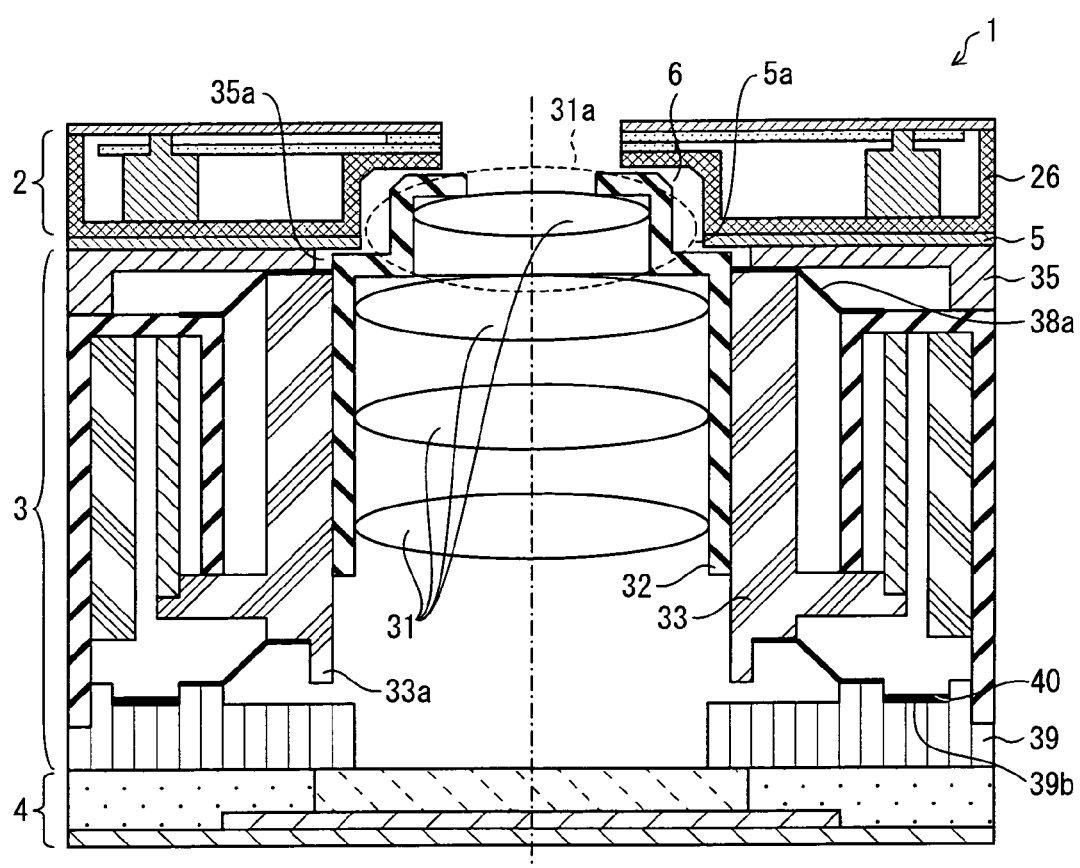
FIG. 7 is a cross-sectional view illustrating a state where a lens is moved to its highest position in the camera module shown in FIG. 1.

Moreover, according to the camera module 1 of the present embodiment, as shown in FIG. 7, the lens unit 3 drives the lens 31 so that the lens 31 is not in touch with the mechanical shutter 2 within a whole movable range of the lens 31.

In a case where the lens 31 is driven as described above, the lens 31 is not in touch with the mechanical shutter 2 within the whole movable range of the lens 31. That is, a space is always ensured between the lens 31 and the mechanical shutter 2. This causes the lens 31 not to be in touch with the mechanical shutter 2 even while the lens 31 is being moved in the optical axis direction so as to adjust the focal length. This allows prevention of a positional displacement (nonuniform focusing) of the lens 31.

Further, according to the camera module 1 of the present embodiment, the lens unit 3 drives the lens 31 so that the lens 31 is not in touch with the magnetic shielding plate 5 within the whole movable range of the lens 31.

In a case where the lens 31 is driven as described above, the lens 31 is not in touch with the magnetic shielding plate 5 within the whole movable range of the lens 31. That is, a space is always ensured between the lens 31 and the magnetic shielding plate 5. This causes the lens 31 not to be in touch with the magnetic shielding plate 5. This allows prevention of a positional displacement (nonuniform focusing) of the lens 31.

As described above, according to the camera module 1 of the present embodiment, a stopper mechanism of the lens unit 3 is triggered when a stroke amount is over a predetermined one, in a case where the lens 31 is driven so that the focal length (upward in the drawing) becomes long. More specifically, in the example shown in FIG. 7, the stopper mechanism is triggered when the plate spring 38a fixed to the upper face of the lens holder 33 is in touch with the cover 35. In the state, the lens 31 is at the highest position. In the state, (i) a space is secured between the lens barrel 32 and the mechanical shutter 2 (the case 26) and (ii) a space is secured between the lens barrel 32 and the magnetic shielding plate 5. Namely, a collision-induced impulse force is not directly exerted on the lens barrel 32. In a case where the collision-induced impulse force is exerted on the lens barrel 32, the focusing position of the lens 31 is likely to be changed. However, according to the camera module 1, no collision-induced impulse force is exerted on the lens barrel 32. This allows prevention of a change in focusing position.

Note that, according to the camera module 1 of the present embodiment, the magnetic shielding plate 5 has an aperture 5a on the light path. The aperture 5a has a diameter which is (i) smaller than the aperture 35a in the lens unit 3 and (ii) larger than the projection 31a of the lens 31. In other words, the diameter of the aperture 5a is equal to or is substantially equal to a diameter of the recessed part 21 of the mechanical shutter 2.

The magnetic shielding plate 5 can be provided by (i) a method in which the magnetic shielding plate 5 is provided on the lens unit 3 after the lens unit 3 is provided on the image pickup unit 4 or (ii) a method in which the mechanical shutter 2 and the magnetic shielding plate 5 are concurrently provided on the lens unit 3 after the magnetic shielding plate 5 is adhered to one of the lens unit 3 and the mechanical shutter 2. In view of simplification manufacturing procedures, the latter method is preferable.

However, the lens barrel 32, in which the lens 31 is held, is fitted into the lens holder 33 after the members such as the base 39 are adhered onto the image pickup unit 4. In order for the aperture 5a of the magnetic shielding plate 5 to have the diameter which is (i) smaller than the aperture 35a in the lens unit 3 and (ii) larger than the projection 31a of the lens 31 as shown in FIG. 5, it is necessary that the mechanical shutter 2 and the magnetic shielding plate 5 are concurrently provided on the lens unit 3 after the magnetic shielding plate 5 is adhered onto the rear face of the mechanical shutter 2.

Further, as shown in FIG. 7, it is possible to make small the diameter of the aperture 5a of the magnetic shielding plate 5, in a case where the aperture 5a of the magnetic shielding plate 5 has a diameter which is (i) smaller than the aperture 35a in the lens unit 3 and (ii) larger than the projection 31a of the lens 31. In other words, it is possible for the magnetic shielding plate 5 to have a large area. This allows an improvement in magnetic shielding effect of the magnetic shielding plate 5. In this case, it is preferable that: the magnetic shielding plate 5 is attached onto the mechanical shutter 2 in advance; the lens barrel 32 is attached to the lens unit 3; work operations such as focus adjustment and fixing are carried out; and, at the last, the mechanical shutter 2 and the magnetic shielding plate 5 are arranged to cover the lens unit 3.

Figure 8:
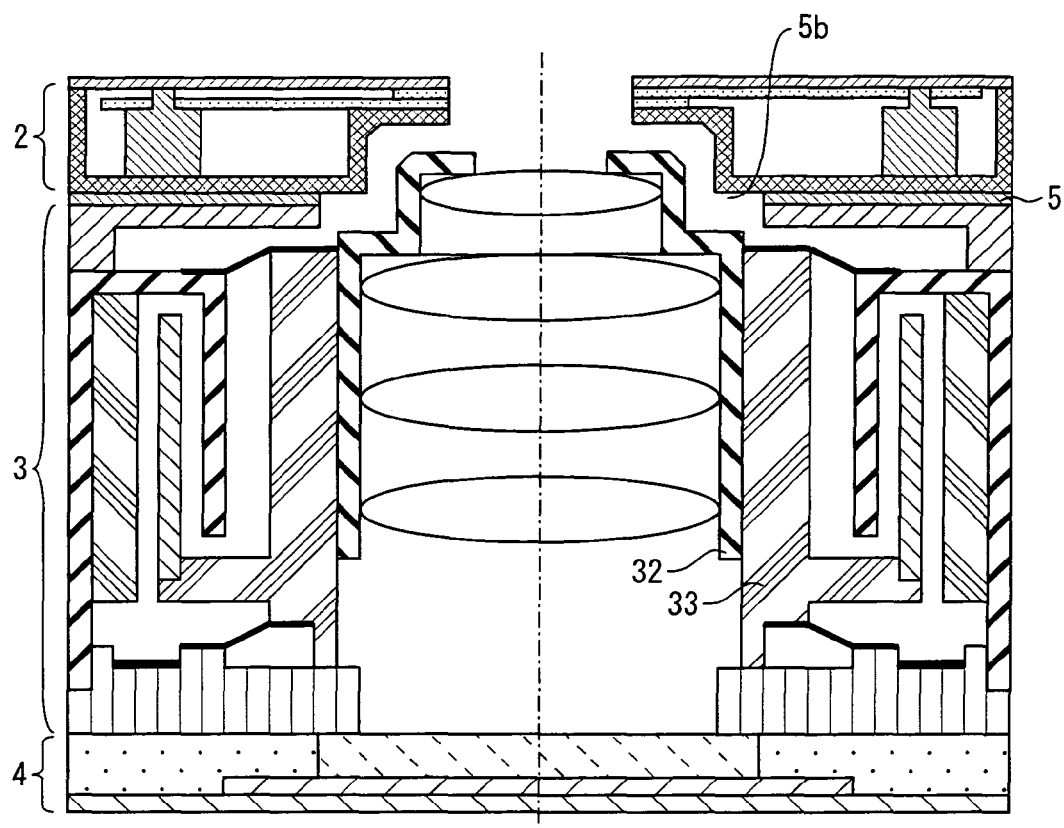
FIG. 8 is a cross-sectional view illustrating another camera module of the present invention.
Figure 9:
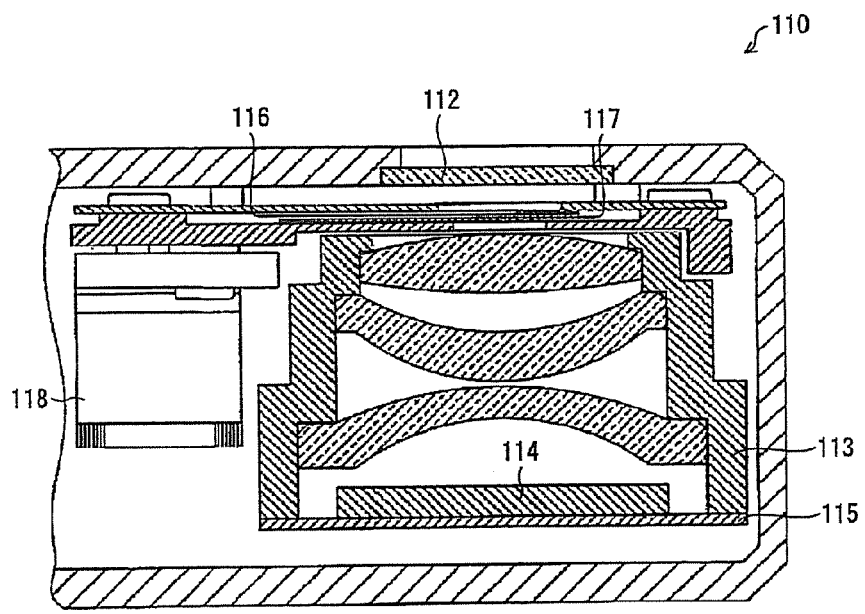
FIG. 9 is a cross-sectional view illustrating a camera module of Patent Literature 1.
Figure 10:
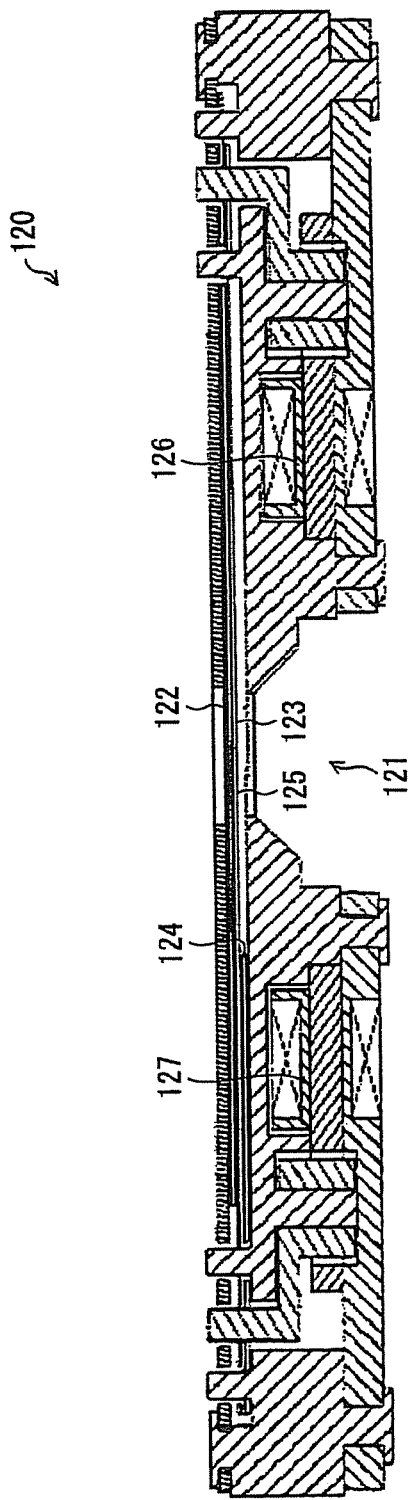
FIG. 10 is a cross-sectional view illustrating a mechanical shutter of Patent Literature 2.

Note that, FIG. 8 shows an arrangement where the lens unit 3 and the magnetic shielding plate 5 are concurrently provided on the rear face of the mechanical shutter 2, after the magnetic shielding plate 5 is adhered onto the top face of the lens unit 3. FIG. 8 is a cross-sectional view illustrating another camera module of the present invention. An aperture 5b in the magnetic shielding plate 5 in FIG. 8 is larger than the aperture 5a of magnetic shielding plate 5 in FIG. 7. That is, the aperture 5b in the magnetic shielding plate 5 is larger than an outer diameter of the lens barrel 32 (i.e., an inner diameter of the lens holder 33). Accordingly, the diameter of the aperture 5b is larger than the diameter of the aperture 5a in FIG. 7. This causes the magnetic shielding plate 5 to have a small area. Accordingly, the magnetic shielding plate 5 shown in FIG. 8 has a slightly less magnetic shielding effect than the magnetic shielding plate 5 in FIG. 7.

However, in the case of the arrangement shown in FIG. 7, the rear face of the magnetic shielding plate 5 is partially exposed in the top face of the lens unit 3. On the other hand, in the case of the arrangement shown in FIG. 8, the magnetic shielding plate 5 is hardly exposed in the top face of the lens unit 3. That is, in the case of the arrangement shown in FIG. 8, the entire upper face (front face) and the entire lower face (rear face) of the magnetic shielding plate 5 make contact with the rear face of the mechanical shutter 2 or the top face of the lens unit 3. As such, according to the arrangement shown in FIG. 8, there is hardly a risk that the light reflected from the magnetic shielding plate 5 becomes stray light, even though the magnetic shielding plate 5 is a member having metallic luster.

As described above, according to the arrangement shown in FIG. 8, the magnetic shielding plate 5 is attached onto the top face of the lens unit 3 before the lens barrel 32 is attached to the lens unit 3. Further, in this case, the aperture 5b, which has a larger diameter than the outer diameter of the lens barrel 32, is formed in the magnetic shielding plate 5 so that the lens barrel 32 can be attached to the lens unit 3.

Note that, in the camera module 1 of the present embodiment, the lens unit 3 has apertures (the aperture 35a on the light-entering side and the aperture 39a on the light-emitting side) at both ends in the optical axis direction (see FIG. 7). This is likely to cause a foreign material from outside to enter the lens unit 3, via the aperture 35a on the light-entering side. Moreover, a foreign material may be generated in the lens unit 3. Further, such a foreign material is likely to get out, via the aperture 39a on the light-emitting side.

More specifically, in a case where a foreign material enters via the aperture 35a in the cover 35 or in a case where a foreign material flakes away from inside of the lens unit 3, it is likely that such a foreign material reaches the base 39, via: the space between the coil 36 and the yoke 34 or the space between the coil 36 and the permanent magnet 37; the space in the pattern of the plate spring 38a and the space in the pattern of the plate spring 38b; and the like. The foreign materials cause a failure due to stain, in a case where the foreign material, which have reached the base 39, get out via the aperture 39a on the light-emitting side and then enter the light path.

In order to address the problem, the lens unit 3 has a prevention measure against such a foreign material. That is, in the lens unit 3, the lens holder 33 has a projection 33a as the prevention measure against the foreign material. The projection 33a is formed circularly on the bottom face of the lens holder 33. That is, the projection 33a has an inner diameter which is larger than the aperture 39a formed on the light emitting side of the base 39. Further, the projection 33a is formed around the circumference of the aperture 39a so as to surround the aperture 39a. This causes a reduction in space in which the foreign material can move. That is, the projection 33a prevents the foreign material from moving from the base 39 toward the aperture 39a. Accordingly, it is possible to drastically reduce a possibility that the foreign material in the lens unit 3 gets out via the aperture 39a.

Note that, in a case where the foreign material gets out via the aperture 39a and falls downward, the fallen foreign material is attached to the solid state image pickup element 42 provided under the lens unit 3 or attached to the transparent member (cover glass) 44. The foreign material thus attached is recognized as an image, thereby causing a stain. The projection 33a can drastically reduce generation of such a stain.

According to the lens unit 3, the projection 33a surrounds the aperture 39a on the light-emitting side. Further, the projection 33a is formed so as to shut out a route via which the foreign material gets out from the aperture 39a. Accordingly, it is possible to reduce a possibility that the foreign material gets out from the aperture 39a.

Further, the lens unit 3 of the present embodiment is arranged so that the lens 31 (lens holder 33) is moved by the electromagnetic force in the optical axis direction. As described above, FIG. 2 shows a state where the drive section is not driven and the lens 31 (lens holder 33) is not moved (steady state: home position). On the other hand, FIG. 7 shows a state where the drive section is driven and the lens 31 (lens holder 33) is moved to its highest position. That is, FIG. 2 shows a state where the lens function is not used, whereas FIG. 7 shows a state where the lens function is used.

In the lens unit 3, the lens 31 (lens holder 33) moves in the optical axis direction in a case where the electromagnetic force is applied in the steady state shown in FIG. 2. This causes the lens holder 33 to be lifted toward the vicinity of the cover 35 or to be lifted until making contact with the cover 35 (see FIG. 7). Further, in the lens unit 3, as shown in FIG. 2, the projection 33a is in touch with the base 39 in the steady state where the lens function is not used. That is, while the drive section is not being driven, the projection 33a is in touch with the base 39. This causes the projection 33a to shut out, in the steady state, the moving route of the foreign material. As such, it is possible to reduce a possibility that the foreign material gets out from the aperture 39a more certainly.

Further, in the steady state of lens unit 3 shown in FIG. 2, while the projection 33a is contacted with the base 39, the lens holder 33 is pressed downward by the elastic force of the plate springs 38a and 38b. That is, the plate springs 38a and 38b press the lens holder 33 toward the light emitting side. This allows the projection 33a to certainly be in touch with the base 39. As such, it is possible that the projection shuts out the moving route of the foreign material more certainly. It is thus possible to more certainly reduce the possibility of entrance and exit of the foreign material via the apertures. That is, it is possible to more certainly reduce the possibility that the foreign material gets out from the aperture 39a.

Note that, in the state shown in FIG. 7, the projection 33a has no effect of shutting out the moving route which guides the foreign material to the aperture 39a on the base 39 (the effect of covering the aperture 39a). Note however that, in the actual camera module 100, the time during which the lens function is used (e.g., the time during which auto focusing is carried out) is much shorter than the time during which the lens function is not in use. That is, during much of time, the lens function is not in use. Accordingly, there occurs no problem, provided that the projection 33a shuts out the moving route of the foreign material at least in the steady state. This allows a sufficient reduction in the possibility that the foreign material gets out from the aperture 39a. Moreover, this allows prevention of the foreign material from falling toward the solid state image pickup element 42 or toward the transparent member (cover glass) 44.

Further, in the camera module 1, a groove 39b is provided on the upper face of the base 39 but in the vicinity of immediately beneath the permanent magnet 37 and the coil 36. Adhesive dust trap agent 40 is applied inside the groove 39b. More specifically, in the base 39 of the lens unit 3, the groove 39b is provided in a surface which faces the bottom face of the lens holder 33. Further, a projection is also provided on the surface which faces the bottom face, and the plate spring 38b is provided on the projection. The provision of such a convexoconcave shape formed by the groove and the projection causes a complexity of the moving route which guides the foreign material from the base 39 toward the aperture 39a on light emitting side. As such, it is possible to more certainly prevent the foreign material from getting out from the aperture 39a on the light emitting side.

Note that the groove 39b and the projection can be provided around the circumference of the aperture 39a or can be provided partially. Moreover, the foreign material can be prevented more certainly from getting out from the aperture 39a as the groove and the projection become more complex.

There is no specific limitation as to where the groove 39b is provided. However, it is preferable that the groove 39b is provided immediately beneath the coil 36 and the permanent magnet 37, like the lens unit 3. That is, it is preferable that the groove 39b is provided immediately beneath a space formed in the optical axis direction between (i) the flange of the lens holder 33 and coil 36 and (ii) the permanent magnet 37. In a case where the groove 39b is thus provided, it is possible that a foreign material, which falls toward the base 39 via the space, reaches the groove 39b and is caught by the groove 39b.

Further, it is preferable that, the dust trap agent 40 is applied, as adhesive agent, onto the front face of the base 39 (the surface facing the bottom face of the lens holder 33). In particular, the dust trap agent 40 is preferable to be applied to inside the groove 39b, like the lens unit 3. With the arrangement, a foreign material which moves onto the base 39 can be caught by the dust trap agent 40. Accordingly, it is possible to certainly prevent a foreign material from getting out from the aperture 39a on the light-emitting side. In a case where the dust trap agent 40 is further applied to the groove 39b, a foreign material is forced to stay in the groove 39b. That is, a foreign material, which falls toward the base 39 via the space, reaches and stays in the groove 39b.

That is, according to the lens unit 3, the dust trap agent 40 is applied onto the base 39 but in the vicinity of immediately beneath the coil 36 and the permanent magnet 37. With the arrangement, in a case where a foreign material, which falls, without being caught in the middle of falling, toward the base 39 via the space between the coil 36 and the permanent magnet 37, the foreign material never fails to fall and reach the dust trap agent 40. On this account, the dust trap agent 40 traps the foreign material.

The dust trap agent 40 can trap a foreign material, provided that the dust trap agent 40 is applied to a component constituting the route which guides the foreign material. Moreover, according to the lens unit 3, the dust trap agent 40 is applied to a section right in front of the projection 33a which shuts out the moving route of the foreign material. This allows most of the foreign materials, which are intercepted by the projection 33a, to be trapped by the dust trap agent 40.

Note that the dust trap agent 40 is not limited to a specific one, provided that the dust trap agent 40 includes adhesive. For example, semisolid (or solid-like) fat or resin can be used as the dust trap agent 40. Among others, grease is suitable for the dust trap agent 40. The grease is one of the semisolid or liquid-like fats, and can be made of semisolid (or solid-like) lubricant or pasted lubricant, for example. Used as the grease is, for example, molybdenum disulfide-based lubricant, white lubricant, silicone-based lubricant, perfluoropolyether-based lubricant, or the like. Moreover, the grease may be: petrolatum-based grease primarily including petrolatum; poly alpha-olefin-based grease primarily including poly alpha-olefin oil; silicone-based grease primarily including silicone oil; fluorosilicone-based grease; perfluoropolyether-based grease primarily including perfluoropolyether; or the like. These greases can be used alone or in combination. Alternatively, the grease can include, for example, additives for grease such as lithium soap, calcium soap, or polytetrafluoroethylene (PTFE).

Note that, according to the lens unit 3, the lens holder 33 includes the projection 33a. Instead, a projection can be provided on the base 39. Alternatively, it is possible to arrange the moving route so as to shut out the moving route which guides the foreign material toward the aperture 39a, regardless of the usage state of the lens function (regardless of the drive state of the drive section).

Figure 13:
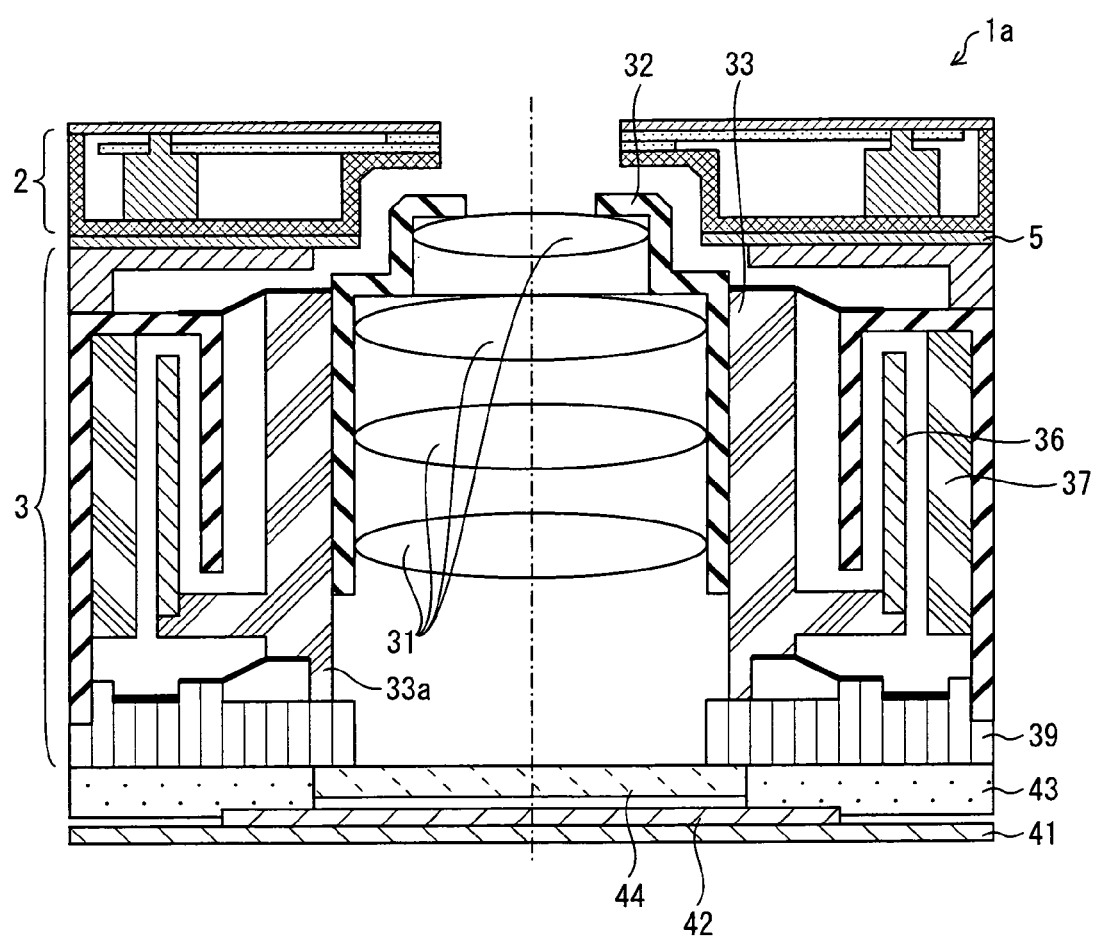
FIG. 13 is a cross-sectional view illustrating yet another camera module of the present invention.
Figure 14:
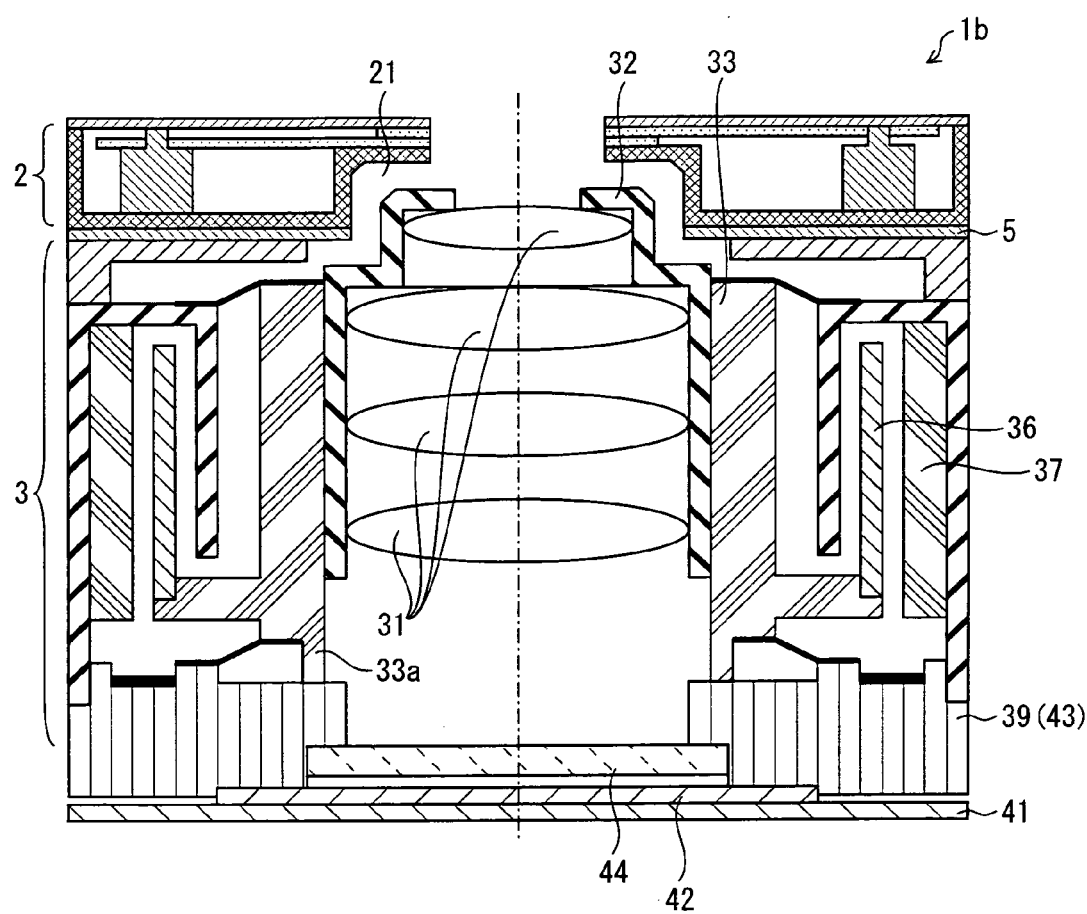
FIG. 14 is a cross-sectional view illustrating still another camera module of the present invention.

The camera module 1 shown in FIG. 1 may have the following configuration. FIGS. 13 and 14 are cross sectional views illustrating another camera modules, respectively (modification examples of the camera module 1 shown in FIG. 2)

In the camera module 1 shown in FIG. 2, the solid state image pickup element 42 is fit into the recessed part in the bottom face of the holder 43. Accordingly, it depends on a size tolerance of the holder 43 whether: the holder 43 is in touch with only the solid state image pickup element 42; the holder 43 is in touch with only the substrate 41; or the holder 43 is in touch with both the solid state image pickup element 42 and the substrate 41.

On the other hand, in the camera module 1a shown in FIG. 13, the holder 43 is designed in size to be certainly in touch with the solid state image pickup element 42. Further, an opening is ensured between the holder 43 and the substrate 41. The opening between the holder 43 and the substrate 41 is filled with adhesive (not illustrated).

In the camera module 1a, a focal position of the lens 31 is set based on the image-pickup face (front face) of the solid state image pickup element 42. For example, the lens 31 (lens barrel 32) is driven in the optical axis direction in the camera module 1a while the bottom face of the base 39 of the lens unit 3 is being in touch with the upper face of the holder 43. This causes a focal length of infinite far end to be adjusted based on the image-pickup face of the solid state image pickup element 42. For example, a screw mechanism provided in both the lens barrel 32 and the lens holder 33 is used for adjusting the focal length. More specifically, a male screw is provided on one of the lens barrel 32 and the lens holder 33 and a female screw is provided on the other. With use of these screws, the height of the lens barrel 32 with respect to the lens holder 33 is adjusted. In the camera module 1a, the holder 43 is in touch with the light receiving face of the solid state image pickup element 42, at which the focal length begins. Moreover, the lens 31 moves in the optical axis direction while the upper face of the holder 43 is being in touch with the bottom part (bottom face of the base 39) of the lens unit 3. Accordingly, this allows a reduction of an error in height of the lens 31 (error in the focal length) with respect to the light receiving face of the solid state image pickup element 42.

The reduction of the error in height of the lens 31 causes the lens barrel 32 to be screwed into the lens holder 33 at a small amount with the screw mechanism. This leads to a reduction of unevenness of the amount to be screwed. The stroke amount of the lens holder 33 is set in accordance with the unevenness of the amount to be screwed. As such, in a case where the unevenness of the amount to be screwed is small, the stroke amount of the lens holder 33 can be lessened. From this, a thrust force required for the lens unit 3 is reduced. The reduction of the stroke amount of the lens holder 33 leads to a reduction of the magnetic force of the permanent magnet 37 provided in the lens unit 3 for driving the lens 31. This makes it possible to miniaturize the permanent magnet 37 and reduce the number of coil turn of the coil 36. This provides an advancing effect of low power consumption of the lens unit 3. Further, the reduction of the magnetic force of the permanent magnet 37 leads to a reduction of the leak magnetic field toward the mechanical shutter 2. This allows a reduction of an effect of the leak magnetic field on the property of the mechanical shutter 2.

On the other hand, a camera module 1b shown in FIG. 14 is an example that the camera module 1a is further improved. The camera module 1b is different from the camera module 1a mainly in that the base 39 of the lens unit 3 and the holder 43 of the image pickup unit 4 are integrated with each other. That is, the base 39 is a single member which serves also as the holder 43. From this, the number of parts can be required less than the camera module 1a, whereby the cost can be reduced. Moreover, in the case where the base 39 and the holder 43 are integrated with each other, a cumulative error due to (i) unevenness of thickness of the holder 43 in the optical axis direction and (ii) unevenness of thickness of the base 39 in the optical axis direction can be reduced, as compared to the case where the base 39 and the holder 43 are individual members. This allows an improvement of an accuracy of the thickness between the upper face (the face in touch with the projection 33a of the lens holder 33) and the lower face (the face in touch with the light receiving face of the solid state image pickup element 42) of the base 39. Accordingly, in the camera module 1b, the error in height (error in the focal length) of the lens 31 with respect to the light receiving face of the solid state image pickup element 42 can be further reduced, as compared to the camera module 1a. This allows an improvement of an accuracy of a position in height of the lens 31. Moreover, as is the case with the camera module 1a, this makes it possible to realize: miniaturization and low power consumption of the lens unit 3; reduction of an effect of the leak magnetic field leaked from the lens unit 3 on the property of the mechanical shutter 2; and the like.

As described above, in the camera module of the present invention, the mechanical shutter and the lens drive device are stacked, and a part of the image pickup lens or the lens barrel is arranged so as to be contained in the recessed part in the center of the mechanical shutter. With the configuration, the thickness of the camera module can be reduced. Moreover, the space between the lens barrel and the mechanical shutter or the space between the lens barrel and the magnetic shielding plate is suitably set so that the collision-induced impulse force is not exerted directly on the lens barrel in a case where the image pickup lens is driven by the lens drive device. Moreover, in order to reduce the stroke amount of the lens unit, a holder for covering the solid state image pickup element is attached directly onto the solid state image pickup element.

Note that the camera module of the present embodiment is suitable for use in a electronic device capable of photographing such as a mobile phone having a camera function, a digital still camera, or a security camera. The camera module of the present embodiment is suitable for use in a mobile phone because the camera module realizes miniaturization and reduction in thickness. In a case where the camera module is provided in a mobile phone, the mobile phone is likely to have a magnetic substance or a permanent magnet. In that case, the direction and the intensity of the leak magnetic field leaked from the lens unit may somewhat be affected by the magnetic substance or the permanent magnet. In view of this, it is preferable that the intensity of the leak magnetic field is set so that (i) the leak magnetic field does not adversely affect the speed at which the mechanical shutter is closed and (ii) the mechanical shutter can be opened without trouble.

The present invention can be described as below.

[1] A camera module includes: a lens drive section for driving an image pickup lens in an optical axis direction, the image pickup lens being held in the lens drive section; a shutter section for closing or opening a light path so that an amount of light incident on the image pickup lens; and an image pickup element for converting an optical signal, which is received via the image pickup lens, into an electrical signal, both the lens drive section and the shutter section being driven by electromagnetic drive means, the shutter section being a moving magnet type in which a permanent magnet serves as a movable section, and a leak magnetic field leaked from the lens drive section acting in a direction for fastening a speed at which a shutter is closed.

With the arrangement, the shutter section (mechanical shutter) is included, thereby preventing generation of the smear. Further, the lens drive section is included, and so the image pickup lens is moved in the optical axis direction, thereby allowing a function of focusing to be carried out.

In the camera module of the invention which includes the moving magnet type shutter section and the VCM type lens drive section, the permanent magnet provided in the lens drive section is appropriately set so as to have the magnetic poles whose magnetic field is directed in a direction in which the leak magnetic field leaked from the lens drive section causes the shutter to be closed at a faster speed. Accordingly, the leak magnetic field does not adversely affect the speed, at which the shutter is closed which is the most important function to the shutter section (shutter fin). More than that, the leak magnetic field leaked from the VCM is utilized to cause the speed at which the shutter is closed to be faster, and this leads to realization of a highly functional shutter section.

As described above, according to the camera module of the present invention, the permanent magnet provided in the lens drive section is set so as to have the magnetic poles whose magnetic field is directed in a direction in which the leak magnetic field leaked from the lens drive section causes the shutter section (mechanical shutter) to be closed at a faster speed. Accordingly, the camera module including the mechanical shutter and the lens drive section provides an effect that the leak magnetic field leaked from the lens drive section does not adversely affect the closing operation of the shutter. That is, with the configuration, even while the moving magnet type shutter and the VCM are used together, the camera module does not adversely affect the closing operation of the shutter.

[2] The camera module as set forth in [1], wherein the shutter section and the lens drive section are substantially stacked in the optical axis direction.

With the arrangement, the shutter section and the lens drive section are stacked in the optical axis direction, whereby the direction of the leak magnetic field leaked from the side face section of the lens drive section becomes almost perpendicular to the optical axis in the vicinity of the drive section (second drive section) of the shutter section. Further, also the magnetic field generated by a magnetic pole section of the shutter section is almost perpendicular to the optical axis, whereby one of the magnetic fields highly affects the other. Accordingly, a fastening effect on the closing speed can be improved by setting the direction of the leak magnetic field leaked from the lens drive section so that the leak magnetic field causes the shutter fin to close at a faster speed.

[3] The camera module as set forth in [2] wherein a magnetic shielding plate is provided between the lens drive section and the shutter section.

In a case where the direction of the leak magnetic field leaked from the lens drive section is set so that the shutter fin closes at a faster speed, the shutter fin opens at a slower speed in contrast. Even though the speed at which the shutter opens is not so important, it is not preferable that the shutter does not open even though a predetermined current is being supplied.

The configuration includes the magnetic shielding plate. This allows a reduction of the leak magnetic field leaked from the lens drive section to the shutter section. This prevents a case where the shutter does not open due to a too large magnetic field.

[4] An electronic device including any one of the camera modules as set forth in [1] to [3].

The camera modules in [1] to [3] achieve miniaturization and reduction in thickness. Accordingly, the camera modules are suitable for use in an electronic device such as a mobile phone.

As described above, the camera module of the present invention includes: a shutter section having a moving magnet type drive mechanism; and a lens drive device driven by the electromagnetic force, a direction of a magnetic field for driving the image pickup lens being set so that the shutter fin closes the light path while a magnetic field leaked from the lens drive section is acting on the drive mechanism of the shutter section. Therefore, even the camera module including the lens drive device and the shutter section, which are driven by electromagnetic force, can provide an effect of preventing generation of the smear.

According to the camera module of the present invention, it is preferable that the lens drive section and the shutter section are stacked in an optical axis direction.

With the arrangement, the lens drive section and the shutter section are stacked in the optical axis direction. That is, the lens drive section is provided so as to be close to the shutter section. This causes the leak magnetic field leaked from the lens drive section to easily act on the shutter section. As such, it is possible to prevent generation of the smear more certainly.

Note that the phrase "the lens drive section and the shutter section are stacked in the optical axis direction" does not merely mean that the lens drive section and the shutter section are arranged in parallel with the optical axis. The phrase also means that the lens drive section and the shutter section are arranged slightly askew (i.e. in substantially parallel) with respect to the optical axis direction.

In the camera module of the present invention, a magnetic shielding plate may be provided between the lens drive section and the shutter section for partially shielding the magnetic field leaked from the lens drive section to the shutter section.

As described above, the leak magnetic field acts so that the light path is closed by the shutter fin. Accordingly, in a case where the leak magnetic field is too large, the light path is closed at a faster speed by the shutter fin, whereas it will become sometimes difficult for the light path to be opened by the shutter fin.

With the arrangement, the magnetic shielding plate causes the leak magnetic field leaked from the lens drive section to the shutter section to be partially shielded. Accordingly, even while an excessive magnetic field is being leaked from the lens drive section, such an excessive leak magnetic field is partially shielded by the magnetic shielding plate. That is, the magnetic shielding plate can reduce the leak magnetic field. From this, even while an excessive magnetic field is being leaked, the shutter fin can open the light path.

Note that "the magnetic field leaked from the lens drive section to the shutter section is partially shielded" indicates that the leak magnetic field is shielded to a degree in which the light path can be opened, while the leak magnetic field from the lens drive section is acting in the direction for shutting out the light path.

The camera module of the present invention may have a configuration wherein: the image pickup lens has, at its leading end, a projection part projecting from a top face of the lens drive section; the shutter section is provided on the top face of the lens drive section; and the shutter section has a recessed part in its rear face in which the projection of the image pickup lens is contained.

In the configuration, the shutter section is provided on the top face of the lens drive section. Accordingly, a width of the lens drive section is not increased even when the shutter section is provided. That is, even when the shutter section is provided, the camera module is not enlarged.

Further, in the configuration, the image pickup lens has the projection, that is, the leading end of the image pickup lens is projected from the top face of the lens drive section. In other words, the top face of the lens drive section is arranged at a lower position than the projection of the image pickup lens. Further, the projection of the image pickup lens is contained in the recessed part in the rear face of the shutter section. As such, a thickness (an apparent thickness) obtained after the shutter section is stacked on the lens drive section becomes thinner than the total thickness of the shutter section and the lens drive section obtained before the shutter section is stacked on the top face of the lens drive section. That is, because the top face of the lens drive section is positioned lower than the projection of the image pickup lens. Accordingly, even in a case where the shutter section is stacked on the lens drive section, the camera module does not become too thick.

This realizes both miniaturization and reduction of thickness of the camera module which includes the mechanical shutter and the lens drive section.

In the camera module of the present invention, it is preferable that the lens drive section drives the image pickup lens so that the image pickup lens is not in touch with the shutter section within a whole movable range of the image pickup lens.

In the configuration, within the whole movable range of the image pickup lens, the image pickup lens is not in touch with the shutter section. That is, a space is always ensured between the image pickup lens and the shutter section. This causes the image pickup lens not to be in touch with the shutter section. This allows prevention of a positional displacement (nonuniform focusing) of the image pickup lens.

In the camera module of the present invention, it is preferable that the lens drive section drives the image pickup lens so that the image pickup lens is not in touch with the magnetic shielding plate within a whole driving range of the image pickup lens.

In the configuration, within the whole driving range of the image pickup lens, the image pickup lens is not in touch with the magnetic shielding plate. That is, a space is always ensured between the image pickup lens and the magnetic shielding plate. This causes the image pickup lens not to be in touch with the magnetic shielding plate. This allows prevention of a positional displacement (nonuniform focusing) of the image pickup lens.

In the camera module of the present invention, it is preferable that: the magnetic shielding plate has an aperture on the light path; and the aperture has a diameter (inner diameter) which is (i) smaller than a diameter (inner diameter) of the aperture, which is formed in the lens drive section, for holding the image pickup lens but (ii) larger than a diameter (outer diameter) of the projection part of the image pickup lens.

In the configuration, the aperture of the magnetic shielding plate has a diameter which is (i) smaller than the aperture in the lens drive section for holding the image pickup lens and (ii) larger than the projection of the image pickup lens. From this, it is possible for the magnetic shielding plate to have a large area. This allows an improvement in magnetic shielding effect of the magnetic shielding plate.

It is preferable that the camera module of the present invention includes a holder for covering the image pickup element so as not to cover a light receiving section of the image pickup element, the holder being in touch with the light receiving face, and the lens drive section driving the image pickup lens in the optical axis direction while an upper face of the holder is being in touch with a bottom section of the lens drive section.

With the configuration, the holder is in touch with the light receiving face of the image pickup element at which the focal length begins. Moreover, the image pickup lens moves in the optical axis direction while the upper face of the holder is being in touch with the bottom part of the lens driving unit. This allows a reduction of an error in height of the image pickup lens (error in the focal length) with respect to the light receiving face of the image pickup element.

In the camera module of the present invention, it is preferable that: the lens drive section includes a base which constitutes the bottom section of the lens drive section; and the holder and the base are integrated with each other.

With the configuration, (i) the holder being in touch with the light receiving face of the image pickup element and (ii) the base constituting the bottom section of the lens drive section are integrated (combined) with each other. That is, the base of the lens drive section serves concurrently as the holder. This makes it possible to form the holder and the base from a single member at the same time. This allows a reduction of a cumulative error due to (i) unevenness of thickness of the holder in the optical axis direction and (ii) unevenness of thickness of the base in the optical axis direction. Accordingly, this makes it possible to further reduce an error in height of the image pickup lens (error in the focal length) with respect to the light receiving face of the image pickup element.

In order to attain the object, the electronic device of the present invention includes any one of the camera modules described above. This can provide an electronic device which can prevent generation of the smear even when the electronic device is provided with a lens drive section and a moving magnet type mechanical shutter which are driven by electromagnetic force.

The present invention is suitable for use in a camera module including a portable terminal such as a communication device. The present invention can devise a secure countermeasure for the smear occurred in a camera module, which includes a moving magnet type mechanical shutter and a VCM type lens drive device.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. A camera module comprising:
a lens drive section for driving an image pickup lens in an optical axis direction by electromagnetic force, the image pickup lens being held in the lens drive section;
a shutter section for closing or opening a light path so that an amount of light incident on the image pickup lens are controlled; and
an image pickup element for converting an optical signal, which is received via the image pickup lens, into an electrical signal,
the shutter section including a moving magnet type drive mechanism for driving the shutter fin by a permanent magnet which is driven by electromagnetic force, and
a direction of a magnetic field for driving the image pickup lens being set so that the shutter fin closes the light path while a magnetic field leaked from the lens drive section is acting on the drive mechanism of the shutter section.

2. The camera module as set forth in claim 1, wherein:
the lens drive section and the shutter section are stacked in the optical axis direction.

3. A camera module as set forth in claim 1, further comprising:
a magnetic shielding plate, provided between the lens drive section and the shutter section, for partially shielding the magnetic field leaked from the lens drive section to the shutter section.

4. The camera module as set forth in claim 1, wherein:
the image pickup lens has, at its leading end, a projection part projecting from a top face of the lens drive section;
the shutter section is provided on the top face of the lens drive section; and
the shutter section has a recessed part in its rear face in which the projection of the image pickup lens is contained.

5. The camera module as set forth in claim 1, wherein:
the lens drive section drives the image pickup lens so that the image pickup lens is not in touch with the shutter section within a whole movable range of the image pickup lens.

6. The camera module as set forth in claim 3, wherein:
the lens drive section drives the image pickup lens so that the image pickup lens is not in touch with the magnetic shielding plate within a whole driving range of the image pickup lens.

7. The camera module as set forth in claim 3, wherein:
the image pickup lens has, at its leading end, a projection part projecting from a top face of the lens drive section;
the magnetic shielding plate has an aperture on the light path; and
the aperture has an inner diameter which is (i) smaller than an inner diameter of the aperture, which is formed in the lens drive section, for holding the image pickup lens but (ii) larger than an outer diameter of the projection part of the image pickup lens.

8. The camera module as set forth in claim 3, wherein:
the magnetic shielding plate is provided on an entire rear face of the shutter section.

9. The camera module as set forth in claim 1, wherein:
the lens drive section includes (i) a lens holder for holding the image pickup lens and (ii) a base provided on a bottom of the lens drive section;
the base has an aperture for securing the light path;
the lens holder has, on its bottom face, a projection provided so as to surround a whole circumference of the aperture of the base.

10. The camera module as set forth in claim 9, wherein:
the base has a surface which (i) faces the bottom face of the lens holder and (ii) has a convexoconcave shape.

11. The camera module as set forth in claim 10, wherein:
a groove is provided on the surface which faces the bottom face of the lens holder but in the vicinity of immediately beneath the permanent magnet.

12. The camera module as set forth in claim 9, wherein:
an adhesive agent is applied onto the surface which faces the bottom face of the lens holder.

13. The camera module as set forth in claim 2, wherein:
the permanent magnet causes a magnetic field to be generated in a direction perpendicular to the optical axis.

14. The camera module as set forth in claim 1, further comprising:
a holder for covering the image pickup element so as not to cover a light receiving section of the image pickup element,
the holder being in touch with the light receiving face, and
the lens drive section driving the image pickup lens in the optical axis direction while an upper face of the holder is being in touch with a bottom section of the lens drive section.

15. The camera module as set forth in claim 14, wherein:
the lens drive section includes a base which constitutes the bottom section of the lens drive section; and
the holder and the base are integrated with each other.

16. An electronic device comprising a camera module,
the camera module including:
a lens drive section for driving an image pickup lens in an optical axis direction by electromagnetic force, the image pickup lens being held in the lens drive section;
a shutter section for closing or opening a light path so that an amount of light incident on the image pickup lens are controlled; and an image pickup element for converting an optical signal, which is received via the image pickup lens, into an electrical signal, the shutter section including a moving magnet type drive mechanism for driving the shutter fin by a permanent magnet which is driven by electromagnetic force, and a direction of a magnetic field for driving the image pickup lens being set so that the shutter fin closes the light path while a magnetic field leaked from the lens drive section is acting on the drive mechanism of the shutter section.

* * * * *